(12) United States Patent
Tang

(10) Patent No.: US 11,997,193 B2
(45) Date of Patent: *May 28, 2024

(54) SECURE COMMUNICATION METHOD AND SMART LOCK SYSTEM BASED THEREOF

(71) Applicant: YUNDING NETWORK TECHNOLOGY (BEIJING) CO., LTD., Beijing (CN)

(72) Inventor: Hao Tang, Beijing (CN)

(73) Assignee: YUNDING NETWORK TECHNOLOGY (BEIJING) CO., LTD., Beijing (CN)

(*) Notice: Subject to any disclaimer, the term of this patent is extended or adjusted under 35 U.S.C. 154(b) by 421 days.

This patent is subject to a terminal disclaimer.

(21) Appl. No.: 17/379,973

(22) Filed: Jul. 19, 2021

(65) Prior Publication Data

US 2021/0351920 A1 Nov. 11, 2021

Related U.S. Application Data

(63) Continuation-in-part of application No. 16/586,995, filed on Sep. 29, 2019, now Pat. No. 11,070,364.
(Continued)

(30) Foreign Application Priority Data

Mar. 29, 2017 (CN) .......................... 201710198457.1

(51) Int. Cl.
*H04L 9/08* (2006.01)
*H04L 9/14* (2006.01)
*H04L 9/32* (2006.01)

(52) U.S. Cl.
CPC .......... *H04L 9/0825* (2013.01); *H04L 9/0847* (2013.01); *H04L 9/14* (2013.01); *H04L 9/3247* (2013.01)

(58) Field of Classification Search
CPC ....... H04L 9/0825; H04L 9/0847; H04L 9/14; H04L 9/3247; H04L 9/3297;
(Continued)

(56) References Cited

U.S. PATENT DOCUMENTS 11,070,364 B2* 7/2021 Tang .................... H04L 63/0492
11,468,719 B2* 10/2022 Einberg ................ H04L 9/0822
(Continued)

FOREIGN PATENT DOCUMENTS

CN 103578165 A 2/2014
CN 104537735 A 4/2015
(Continued)

OTHER PUBLICATIONS

Notice of Reasons for Rejection in Japanese Application No. 2020-502749 dated Mar. 7, 2022, 16 pages.
(Continued)

*Primary Examiner* — Abiy Getachew
(74) *Attorney, Agent, or Firm* — METIS IP LLC

(57) ABSTRACT

The present disclosure provides a secure communication method, and the method may include: a sending terminal may generate data to be transmitted and determine encrypted data by encrypting the data to be transmitted using a preset encryption algorithm based on an encryption key. The encryption key may be obtained by a key exchange process between a smart door lock and a mobile terminal through a preset secure communication channel. The sending terminal may assign a unique identifier to the encrypted data and may send the encrypted data with a unique identifier to the receiving terminal, so that the receiving terminal may perform identity authentication on the encrypted data with the unique identifier and may decrypt the encrypted data based on the encryption key obtained by the key exchange process according to a result of the identity authentication.

20 Claims, 9 Drawing Sheets

Related U.S. Application Data which is a continuation of application No. PCT/CN2018/079999, filed on Mar. 22, 2018.

(58) Field of Classification Search
CPC .......... H04L 2209/805; G07C 9/00309; G07C 2009/00412; H04W 4/80; H04W 12/03; H04W 12/47; H04W 12/08; H04W 12/108

See application file for complete search history.

(56) References Cited

U.S. PATENT DOCUMENTS

| | | | |
|---|---|---|---|
| 2014/0201776 A1 | 7/2014 | Minemura et al. | |
| 2015/0045013 A1 | 2/2015 | Simmons | |
| 2016/0042581 A1* | 2/2016 | Ku | G07C 9/00309 340/5.61 |
| 2017/0006392 A1* | 1/2017 | Pedersen | H04R 25/70 |
| 2017/0111174 A1* | 4/2017 | Zhang | H04L 9/3213 |

FOREIGN PATENT DOCUMENTS

| | | |
|---|---|---|
| CN | 104806085 A | 7/2015 |
| CN | 105096419 A | 11/2015 |
| CN | 105654580 A | 6/2016 |
| CN | 105894627 A | 8/2016 |
| CN | 106097486 A | 11/2016 |
| CN | 106408697 A | 2/2017 |
| CN | 106504391 A | 3/2017 |
| CN | 107038777 A | 8/2017 |
| JP | 2009212732 A | 9/2009 |
| JP | 2017505253 A | 2/2017 |
| WO | 2016023558 A1 | 2/2016 |
| WO | 2016130386 A1 | 8/2016 |

OTHER PUBLICATIONS

International Search Report in PCT/CN2018/079999 dated Jun. 7, 2018, 6 pages.

Written Opinion in PCT/CN2018/079999 dated Jun. 7, 2018, 9 pages.

John Padgette et al., Guide to Bluetooth Security: Recommendations of the National Institute of Standards and Technology, National Institute of Standards and Technology Special Publication, 2012, 47 pages.

The Extended European Search Report in European Application No. 18774831.4 dated Mar. 16, 2020, 11 pages.

The Third Office Action in Chinese Application No. 201710198457.1 dated Feb. 3, 2020, 13 pages.

* cited by examiner

SECURE COMMUNICATION METHOD AND SMART LOCK SYSTEM BASED THEREOF

CROSS-REFERENCE TO RELATED APPLICATIONS

This application is a continuation-in-part of U.S. patent application Ser. No. 16/586,995, filed on Sep. 29, 2019, which is a continuation of International Application No. PCT/CN2018/079999, filed on Mar. 22, 2018, designating the United States of America, which claims priority to Chinese Application No. 201710198457.1 filed on Mar. 29, 2017, the contents of each of which are hereby incorporated by reference in their entirety.

TECHNICAL FIELD

The present disclosure generally relates to secure communication technology in the field of smart home and security surveillance.

BACKGROUND

Smart door locks currently available on the market are equipped with communication functions. Information of the smart door locks may be transmitted to a server, and then forwarded to an application (APP), or the like, used by users. Users may also remotely issue passwords, grant permissions, etc., through the server. The more smart door locks are installed, the more important the security of remote communication is. As a center of the communications, the server is at high risk to be attacked, which may cause serious accidents such as password leakage or doors being opened without proper authorization.

To address these problems, existing solutions include the following:

(1) Prohibiting the remote unlocking function. However, most smart door locks may remotely issue a password, a Bluetooth key, or the like. If the server is attacked, the unlocking permission may be obtained by causing, by the attacked server, a smart lock to issue a password or a Bluetooth key, and then an unlocking operation may be performed locally.

(2) Encrypted communication is used between a door lock and a server, and communication between a user APP and the server also uses encryption techniques such as https. Although this method may prevent data fetching during the data transmission in the communication network, an attacker may obtain a password and a Bluetooth key from the server because key information, such as passwords and Bluetooth keys, is stored in the server. At the same time, without the functions of identity authentication, anti-replay, and anti-tampering, the problem of how to issue a relevant command to the door lock or the mobile terminal if the server is attacked is not solved.

(3) In the communication between the server and the mobile terminal or the door lock, anti-replay and anti-tampering functions are employed. However, because the server is compromised, normal communication between the server and the mobile terminal or the door lock may be simulated, and the identity authentication on the server-side cannot be intercepted.

At present, secure communication techniques are unavailable on the market that can prevent a server or a staff member from obtaining a user's transmission information from the server, or that can maintain the functions of identity authentication, anti-replay, and anti-tampering in the communication between the door lock and the mobile terminal even if the server is compromised.

SUMMARY

The present disclosure provides a secure communication method applicable in a smart door lock system to overcome the shortcomings described above. The technical solutions are as follows:

According to a first aspect of the present disclosure, a secure communication method is provided, the method may be applied to a smart door lock system, the smart door lock system may include a smart door lock and a mobile terminal, and the method may include:

generating, by a sending terminal, data to be transmitted according to an operational instruction or a preset rule, and determining encrypted data by encrypting the data to be transmitted using a preset encryption algorithm based on an encryption key, wherein the sending terminal is the smart door lock or the mobile terminal, the encryption key is obtained by a key exchange process between the smart door lock and the mobile terminal through a preset secure communication channel; wherein the preset secure communication channel is a short-range wireless communication channel or a Near-Field communication (NFC) channel activated upon an authorization by the smart door lock and the mobile terminal;

assigning, by the sending terminal, a unique identifier to the encrypted data; and sending, by the sending terminal, the encrypted data with the unique identifier to the receiving terminal, so that the receiving terminal performs an identity authorization on the encrypted data with the unique identifier and decrypts the encrypted data using the encryption key according to a result of the identity authorization;

wherein the sending terminal includes the smart door lock, and the receiving terminal includes the mobile terminal; or the sending terminal includes the mobile terminal, and the receiving terminal includes the smart door lock.

In some embodiments, the sending, by the sending terminal, the encrypted data with the unique identifier to the receiving terminal, may include:

sending, by the sending terminal, the encrypted data with the unique identifier to the receiving terminal through the preset secure communication channel or a cloud server, wherein the preset secure communication channel includes a short-range wireless communication channel or an NFC channel.

In some embodiments, the encryption key may be determined by authenticating an initial encryption key by the smart door lock and the mobile terminal, wherein the initial encryption key may be generated by the smart door lock or the mobile terminal in response to a user's authorization instruction, wherein the initial encryption key may be a key that is automatically generated by the smart door lock or the mobile terminal or manually inputted, and the initial encryption key may be transmitted between the smart door lock and the mobile terminal through the preset secure communication channel.

In some embodiments, the encryption key may include a first encryption key, the determining the encrypted data by encrypting the data to be transmitted using the preset encryption algorithm based on the encryption key may include:

determining initial encrypted data by encrypting the data to be transmitted using a symmetric encryption algorithm based on the first encryption key;

configuring a preset key value for the initial encrypted data, wherein the preset key value is at least one of a timestamp, a counter reading, or a random code; and determining the encrypted data by adding a verification signature to the initial encrypted data configured with the preset key value.

In some embodiments, the encryption key stored in the sending terminal and the receiving terminal, respectively, may include a public key and a private key, and the determining the encrypted data by encrypting the data to be transmitted using the preset encryption algorithm based on the encryption key may include:

determining, by the sending terminal, initial encrypted data by encrypting the data to be transmitted using an asymmetric encryption algorithm based on the public key stored in the sending terminal;

configuring a preset key value for the initial encrypted data, wherein the preset key value is at least one of a timestamp, a counter reading, or a random code; and determining the encrypted data by adding the private key stored in the sending terminal to the initial encrypted data configured with the preset key value as a verification signature.

In some embodiments, the method may further comprise:

obtaining, by a backup mobile terminal, account login verification information, wherein the account login verification information includes information for verifying the identity of the user, and the backup mobile terminal is a backup device of the mobile terminal;

if the account login verification information is verified, the backup mobile terminal, in response to an authorization of a deletion operation by the user, sends a first deletion instruction to the smart door lock to instruct the smart door lock to delete locally stored encryption key information, and/or, the backup mobile terminal, in response to a remote authorization of a deletion operation by the user, sends a second deletion instruction to the cloud server to instruct the cloud server to delete the encryption key information stored in the mobile terminal.

According to a second aspect of the present disclosure, a method for secure communication is provided. The method may be applied to a smart door lock system, wherein the smart door lock system may include a smart door lock and a mobile terminal. The method may include:

receiving, by the receiving terminal, encrypted data with a unique identifier sent by a sending terminal, wherein the sending terminal includes the smart door lock, and the receiving terminal includes the mobile terminal, or the sending terminal includes the mobile terminal, and the receiving terminal includes the smart door lock; wherein the encrypted data with the unique identifier is determined, by the sending terminal, through determining data to be transmitted according to an operational instruction or a preset rule, determining encrypted data by encrypting the data to be transmitted using a preset encryption algorithm based on an encryption key, and assigning a unique identifier to the encrypted data; wherein the encryption key is obtained by a key exchange process between the smart door lock and the mobile terminal through a preset secure communication channel; wherein the preset secure communication channel is a short-range wireless communication channel or a Near-Field communication (NFC) channel activated upon an authorization by the smart door lock and the mobile terminal;

determining, by the receiving terminal, a result of the identity authorization by performing an identity authorization on the encrypted data with the unique identifier;

determining, by the receiving terminal, the data to be transmitted by decrypting the encrypted data using the encryption key obtained by the key exchange process according to the result of the identity authorization.

In some embodiments, the encryption key may be a first encryption key, the encrypted data may be determined through determining initial encrypted data by encrypting the data to be transmitted using a symmetric encryption algorithm based on the first encryption key, configuring a preset key value for the initial encrypted data, and adding a verification signature to the initial encrypted data configured with the preset key value;

wherein the determining, by the receiving terminal, the data to be transmitted by decrypting the encrypted data using the encryption key obtained by the exchange according to the result of the identity authorization including:

if the result of the identity authorization is a match, the receiving terminal verifies the signature of the encrypted data;

if the result of the signature verification is a match, the receiving terminal verifies whether the preset key value is legal; and if the preset key value is legal, the receiving terminal obtains the initial encrypted data from the encrypted data and determines the data to be transmitted by decrypting the initial encrypted data using an inverse algorithm of the symmetric encryption algorithm based on the first encryption key.

In some embodiments, the encryption key stored in the sending terminal and the receiving terminal, respectively, may include a public key and a private key. The encrypted data may be determined through determining initial encrypted data by encrypting the data to be transmitted using an asymmetric encryption algorithm based on the public key stored in the sending terminal, configuring a preset key value for the initial encrypted data, and adding the private key stored in the sending terminal as the verification signature to the initial encrypted data configured with the preset key value;

the determining, by the receiving terminal, the data to be transmitted by decrypting the encrypted data using the encryption key obtained by the key exchange process according to the result of the identity authorization including:

if the result of the identity authorization is a match, the receiving terminal verifies the verification signature of the encrypted data using a public key stored in the receiving terminal;

if the result of the signature verification is a match, the receiving terminal verifies whether the preset key value is legal;

if the preset key value is legal, the receiving terminal obtains the initial encrypted data from the encrypted data and determines the data to be transmitted by decrypting the initial encrypted data using the asymmetric encryption algorithm based on the first encryption key.

In some embodiments, the performing, by the receiving terminal, an identity authorization on the encrypted data with the unique identifier may include:
- extracting, by the receiving terminal, the unique identifier from the encrypted data with the unique identifier;
- obtaining the encryption key that matches the unique identifier according to a unique identifier analysis; and
- determining the result of the identity authorization based on the encryption key.

According to a third aspect of the present disclosure, a smart door lock system is provided. The smart door lock system may include:
- a smart door lock, configured to encrypt data to be transmitted using an encryption key and decrypt received encrypted data according to a preset encryption algorithm, wherein the smart door lock includes a short-range wireless communication module; and
- a mobile terminal, configured to encrypt data to be transmitted using the encryption key and decrypt received encrypted data according to the same preset encryption algorithm as the smart door lock, wherein the mobile terminal is further configured to control the smart door lock, and the mobile terminal includes a short-range wireless communication module for communicating with the smart door lock.

In some embodiments, the smart door lock may further include a configuration mode activation module, configured to activate a configuration mode for generating and exchanging the encryption key. The configuration mode activation module may include at least one of a configuration key, a configuration mode touch key, a touch screen for inputting an administrator password, or a fingerprint collector for inputting a fingerprint of an administrator.

In some embodiments, the controlling the smart door lock by the mobile terminal may include controlling the smart door lock by a smart door lock control APP, wherein the smart door lock control APP may include a virtual key for activating the configuration mode configured to activate the configuration mode of the mobile terminal.

According to a secure communication method applicable in a smart door lock system of the present disclosure, a smart door lock and a mobile terminal may both activate the secure communication under a user's authorization. That is to say, the smart door lock and an APP of each mobile terminal may send and exchange an encryption key through a short-range wireless communication channel or a Near-Field communication (NFC) channel under the user's authorization, thereby allowing a secure exchange of the encryption key. A same or corresponding encryption algorithm may be set on the smart door lock and the APP of each mobile terminal. Encryption and decryption processes may be performed locally using the encryption algorithm, to achieve end-to-end encryption communication. It may prevent a server end or an internal staff member of the smart door lock manufacturer from obtaining information transmitted by a user from the server. It may allow that even if the server is compromised, the functions of identity authentication, anti-replay, and anti-tampering in the communication between the door lock and the mobile terminal may remain intact, thereby protecting user information. Because the generation and exchange of an encryption key are performed locally between the mobile terminal and the smart door lock through a short-range wireless communication channel or the NFC channel, the server does not store information relating to encryption keys, cannot decrypt data forwarded by it, thereby protecting data security. Even if the server is attacked and someone sends a fake command to the mobile terminal or the door lock through the server or a communication network of the server, both the mobile terminal and the door lock do not respond for failure of an identity authentication. The mobile terminal or the door lock may analyze and determine not to respond if someone replays or tampers a command on the server or the communication network of the server. If an attack exemplified above occurs, the mobile terminal or the door lock may send an alert to the server or locally if needed.

The description is only an overview of the present disclosure technical solution. For illustration purposes, technical features of the present disclosure are provided in the specification, and the following are embodiments of the present disclosure.

BRIEF DESCRIPTION OF THE DRAWINGS

Various other advantages and benefits will become apparent to any person skilled in the art by reading the following detailed description of exemplary embodiments. The drawings are for the purpose of illustration and description only and are not intended to limit the scope of the present disclosure. Also, like reference numerals represent similar structures throughout the several views of the drawings. In the drawings.

DETAILED DESCRIPTION

Figure 1:
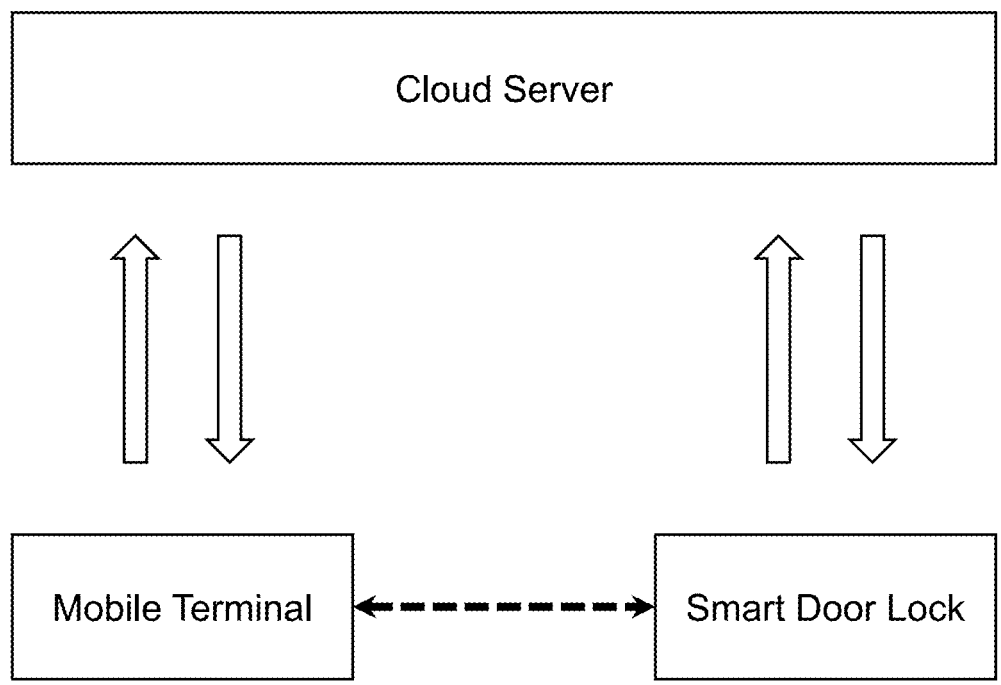
FIG. 1 is a schematic structural diagram illustrating an exemplary smart door lock system according to some embodiments of the present disclosure.

The present disclosure provides an unlocking method for a smart door lock.

In order to enable any person skilled in the art to understand the present disclosure better, the technical solutions in some embodiments of the present disclosure will be clearly and completely described below in conjunction with the drawings of the present disclosure. It is apparent that the described embodiments are only part of but not all of the embodiments of the present disclosure. Based on the embodiments of the present disclosure, any other embodiments obtained by any person skilled in the art should be extended to the scope of the present disclosure.

As used herein, the terms "first," "second," "third," "fourth," or the like (if present) in the specification and claims of the present disclosure are used to distinguish similar objects and are not necessarily used to describe a particular order. It will be further understood that data used in this way may be interchanged where appropriate so that the embodiments described herein can be implemented in a sequence other than what is illustrated or described herein. In addition, the terms "including," "having," and any variants thereof are intended to cover a non-exclusive inclusion, for example, a process, a method, a system, a product or a device that includes a series of operations or units is not necessarily limited to those operations or units clearly listed, but may include other operations or units not clearly listed or inherent to such processes, methods, products, or devices. Exemplary embodiments of the present disclosure will be described in more detail below with reference to the drawings. While the exemplary embodiments have been shown in the drawings of the present disclosure, it is understood that the invention may be implemented in one or more of various forms and not limited by the embodiments described herein. Rather, these embodiments are provided so that this disclosure will be more fully understood and the scope of the disclosure will be fully disclosed to any person skilled in the art.

It should be noted that the above descriptions of the smart door lock system are intended to be illustrative, and not to limit the scope of the present disclosure. The above descriptions of the smart door lock system may be applied in a variety of scenarios including, e.g., a vehicle, a door, a building, an intelligent home, or the like. For example, the smart lock may be a car door lock (e.g., the lock of a shared car or a private car), a bicycle lock (e.g., the lock of a shared bicycle or a private bicycle), an apartment/room/house door lock (e.g., the lock of a shared apartment/room/house or a private apartment/room/house), a lock for a shared or private closet or locker, or the like. It should be noted that the secure communication methods disclosed herein are described in the context of a smart lock for illustration purposes and not intended to be limiting. The secure communication methods disclosed herein may be applied in a variety of scenarios including, e.g., access authentication in data exchange, key exchange, device-to-device communication; or multi-device-to-multi-device communication, or the like. The communication methods may be used to facilitate secure communication between at least two devices, a first device and a second device, e.g., between an application device and a control device, between two control devices, between two application devices, etc. The control device may include a mobile device (or mobile terminal), a remote control, a keypad, or the like, or any combination thereof. The application device may be an intelligent device or a non-intelligent device. The application device may be a lock, a visual doorbell, a camera, a monitoring device, an intelligent speaker, an intelligent power switch, a lighting device, an intelligent gateway, an environmental electrical appliance (e.g., an air cleaner), a sensor, a kitchen appliance, entertainment equipment, a household electrical appliance (e.g., a washing machine), a health monitoring device (e.g., a tonometer), or the like. One of the first device and the second device may be a sending terminal, while the other may be a receiving terminal. The at least two devices may be involved in a multi-way (e.g., two-way) communication. For instance, each of a sending terminal and a receiving terminal may send and receive data or information in a secure communication in order to operate (e.g., lock or unlock) a lock, gain permission to exchange information, etc. The data sent or received by the sending terminal or the receiving terminal may be a password of the application device (or the control device), an instruction, a data package, or the like. For example, the application device may generate data to be transmitted (e.g., a password, video data, audio data, an operational instruction, etc.) and the data to be transmitted may be transmitted to the control device (or the application device) using the communication method described in the present disclosure.

Please refer to FIG. 1, a schematic structural diagram illustrating an exemplary smart door lock system according to some embodiments of the present disclosure. As shown in FIG. 1:

the smart door lock system of the present disclosure may include: a smart door lock and a mobile terminal remotely connect to a cloud server;

the smart door lock may be configured to include a preset encryption algorithm, wherein the preset encryption algorithm may be configured to encrypt data to be transmitted and decrypt received encrypted data; the smart door lock may include at least one of a Bluetooth communication module, a Zigbee communication module, or a Near Field Communication (NFC) communication module;

the mobile terminal may include at least one of a Bluetooth communication module, a Zigbee communication module, or a Near Field Communication (NFC) communication module; the mobile terminal may be configured to include a preset encryption algorithm that is the same as the preset encryption algorithm of the smart door lock, wherein the preset encryption algorithm may be configured to encrypt data to be transmitted and decrypt received encrypted data;

the cloud server may be configured to transmit data between the smart door lock and the mobile terminal.

It should be noted that the above descriptions of the smart door lock system are intended to be illustrative, and not to limit the scope of the present disclosure. Many alternatives, modifications, and variations will be apparent to those skilled in the art. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. The cloud server described in the disclosure may be replaced by another device or computer program. The device or computer program may provide a service to the smart door lock and/or the mobile terminal. The device or computer program may be a traditional server, an elastic computer service (ECS), a web server, an application server, a proxy server, a mail server, a virtual server, a blade server, a file server, or a policy server, or the like, or any combination thereof.

In some embodiments, the short-range wireless communication module may include at least one of the Bluetooth communication module, the Zigbee communication module, or the NFC communication module. Based on the short-range wireless communication module, a preset communication channel may be established. The preset communication channel may be a short-range wireless communication channel or an NFC channel. The smart door lock and the mobile terminal may transmit data through the preset communication channel, for example, the smart door lock or the mobile terminal may transmit encrypted data through the preset communication channel.

In some embodiments, the at least one of the Bluetooth communication module, the Zigbee communication module, or the Near Field Communication (NFC) communication module may be replaced using some other communication module. Additionally or alternatively, the smart door lock and the mobile terminal may include a short-range wireless communication module, a mobile internet communication module, a traditional internet communication module, a wired serial transmission module, or the like, or any combination thereof. For example, the smart door lock and/or the mobile terminal may include a Narrow Band Internet of Things NB-IoT) communication circuit, a cellular network communication circuit, a WiFi communication circuit, a radio frequency identification circuit, or the like, or a combination thereof.

In some embodiments of the present disclosure, the smart door lock system may further include a cloud server, and the mobile terminal and the smart door lock may transmit data remotely through the cloud server.

The smart door lock may further include a configuration mode activation module, wherein the configuration mode activation module may be configured to activate a configuration mode for generating and exchanging an encryption key. The configuration mode activation module may include: at least one of a configuration key, a configuration mode touch key, a touch screen for inputting an administrator password, or a fingerprint collector for inputting a fingerprint of an administrator;

an APP of the mobile terminal, for controlling the smart door lock, may be configured to include a virtual key for activating a configuration mode, wherein the virtual key may be configured to activate the configuration mode of the mobile terminal;

the smart door lock system may be configured to implement the following secure communication method based on the smart door lock system.

In some embodiments, the smart lock may further include an alert module, a storage module, a processing module, a display module, an input module, or the like, or a combination thereof. For example, the smart lock may include a keypad to allow a user to input a password.

In some embodiments, the APP of the mobile terminal may be a smart lock APP. The smart lock APP may correspond to one or more accounts set by a user. The one or more accounts may correspond to one or more smart door locks.

It should be noted that the above descriptions of the smart door lock system are intended to be illustrative, and not to limit the scope of the present disclosure. Many alternatives, modifications, and variations will be apparent to those skilled in the art. In some embodiments, the cloud sever may be omitted and data may be transmitted through the preset secure communication channel.

Figure 2:
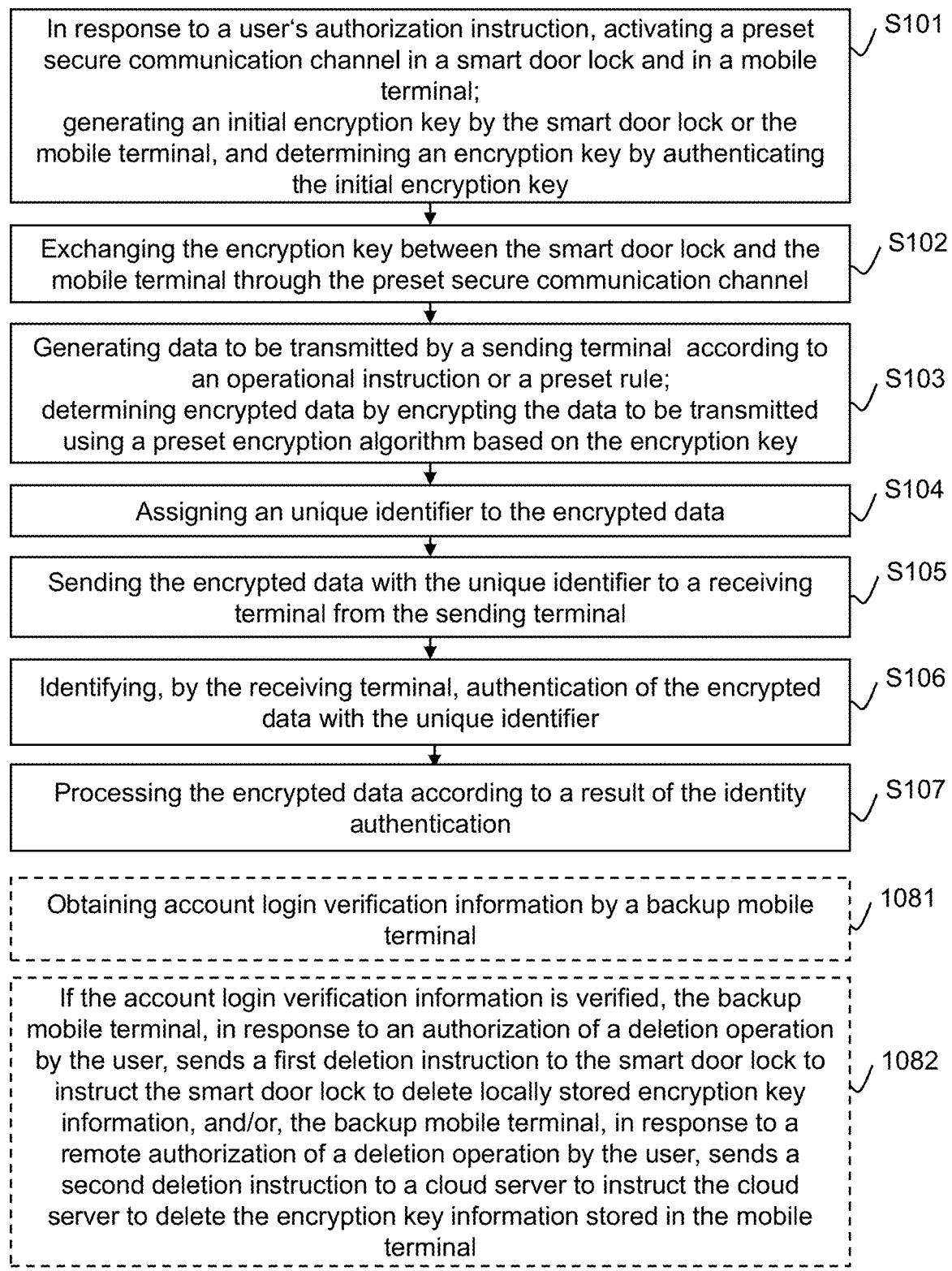
FIG. 2 is a schematic flowchart illustrating an exemplary secure communication method applicable in a smart door lock system according to some embodiments of the present disclosure.

Please refer to FIG. 2, a schematic flowchart illustrating an exemplary secure communication method applicable in a smart door lock system of the present disclosure. As shown in FIG. 2, a secure communication method applicable in the smart door lock system of the present disclosure may include:

Operation S102: a smart door lock and a mobile terminal may exchange an encryption key through a preset secure communication channel. The preset secure communication channel may be a communication channel activated by an authorization of the smart door lock and the mobile terminal. The secure communication channel may include a short-range wireless communication channel or an NFC channel. For example, the secure communication channel may include one of a WIFI local area network, a Bluetooth channel, a Zigbee channel, or an NFC channel.

In some embodiments of the present disclosure, the smart door lock may correspond to a plurality of mobile terminals, and a user may control the smart door lock using any one of the plurality of mobile terminals. If a smart door lock is paired with 3 mobile terminals, each mobile terminal may be installed with a smart door lock APP, and each APP may correspond to an account. The smart door lock and the mobile terminal with the smart door lock APP may communicate through a communication channel activated by an authorization of the smart door lock and the mobile terminal. For example, the smart door lock and the mobile terminal with the smart door lock APP may enter a configuration mode after being authorized and then an independent encryption key may be separately exchanged through the short-range wireless communication channel or the NFC channel. The encryption key may be used to encrypt data to be transmitted. The encryption key may be a symmetric key or an asymmetric key. The mobile terminal may include but is not limited to a smartphone, a tablet computer (IPAD), a smartwatch or a wristband pre-configured with a smart door lock APP, a small controller, or the like, or any combination thereof. The smart door lock and the mobile terminal may configure the communication module according to some setting requirements. For example, a mobile phone A with the smart door lock APP may activate a Bluetooth module, and the smart door lock may also activate a Bluetooth module to exchange a pre-generated encryption key through Bluetooth communication. Since the generation of the encryption key are performed locally in the mobile terminal and the smart door lock and the exchange of the encryption key are performed through the short-range wireless communication channel or the NFC channel, even if the server contains some relevant keys, the server cannot understand the data forwarded by it, that ensuring the security of the data.

The exchanged encryption key may be stored as encryption key information in the smart door lock and the mobile phone. The encryption key information may include the exchanged encryption key and a unique identifier of the smart door lock or the mobile phone. For example, the smart door lock (or a control device) may store an encryption key and a unique identifier of a control device (or a smart door dock) from which the encryption key is received. As another example, the smart door lock (or a control device) may store an encryption key and a unique identifier of a control device (or a smart door dock) to which the encryption key has been sent. As used herein, a unique identifier may be a string of numbers, letters, symbols, or the like, or a combination thereof. A unique identifier may be associated with a single entity within a given system. The unique identifier may be used to address or identify that entity so that the entity can be accessed and interacted with. In some embodiments of the present disclosure, a unique identifier may be assigned to a device or entity, e.g., a smart lock, a control device, etc., to distinguish the device from other entities. A unique identifier may be a Media Access Control (MAC) address of a device (e.g., a sending terminal), an IP address, a specific tag, a username or a user ID, or the like, or any combination thereof.

Operation S103: the sending terminal may generate data to be transmitted according to an operational instruction or a preset rule, and determine encrypted data by decrypting the data to be transmitted using a preset encryption algorithm based on the encryption key. The sending terminal may include the smart door lock or the mobile terminal.

The preset encryption algorithm may be a symmetric algorithm or an asymmetric algorithm. The symmetric algorithm may also be referred to as a secret key algorithm. The symmetric algorithm may be a cryptographic algorithm that uses a same key to encrypt and decrypt data. Exemplary symmetric algorithms may include the U.S. Department of Defense's Data Encryption Standard (DES), the Triple DES, the International Data Encryption Algorithm (IDEA), the Advanced Encryption Standard (AES), or the like. The asymmetric algorithm may also be referred to as a public key algorithm. The asymmetric algorithm may be a cryptographic algorithm that uses different keys to encrypt and decrypt data. Exemplary asymmetric algorithms may include the Rivest-Shamir-Adleman (RSA) algorithm, the Diffie-Hellman algorithm, the Elliptic Curve Cryptography (ECC) algorithm, the Digital Signature Algorithm (DSA) algorithm, or the like.

Specifically, the smart door lock and the mobile terminal may be configured with a same encryption algorithm. In some embodiments, the smart door lock and the mobile terminal may be configured with an inverse algorithm corresponding to the encryption algorithm. Encryption and decryption may be performed locally in the smart door lock and the mobile terminal to implement an end-to-end secure data communication, thereby reducing the risk of information leakage. The built in encryption algorithm in the mobile terminal may be implemented by the smart door lock APP pre-installed in the mobile terminal.

In some embodiments, the sending terminal may be one of the mobile terminal or the smart door lock. The sending terminal may include the mobile terminal, and the receiving terminal may include the smart door lock. The sending terminal may include the smart door lock, and the receiving terminal may include the mobile terminal. The sending terminal and the receiving terminal may be set depending on the needs of a user, which is not limited in the present disclosure. The sending terminal may generate data to be transmitted according to an operational instruction or a preset rule, and determine encrypted data by encrypting the data to be transmitted using a preset encryption algorithm based on an encryption key. In some embodiments, if the mobile terminal constitutes the sending terminal, and the receiving terminal includes the smart door lock constitutes the receiving terminal, the encrypted data may include information configured to cause the smart door lock to unlock or lock. The operational instruction may be an instruction to request data or request to perform an action, as illustrated in examples of the present disclosure, the operational instruction may be an instruction to issue an unlock password, request a Bluetooth key, unlock remotely, delete a password, etc. The preset rule may be understood as a rule that is already set. For example, the preset rule may be a preset time rule, such as, each time of the lock is unlocked, every 12 hours, etc. The data to be transmitted may be data that needs to be transmitted securely between the smart door lock and the mobile terminal. In some embodiments, data to be transmitted may be a smart door lock password, a Bluetooth key, an unlock record, a history, a sensor status, or the like, or any combination thereof.

The data to be transmitted is generally sensitive and may need to be transmitted via a secure transmission technique. Therefore, the data to be transmitted may be encrypted using a preset encryption algorithm based on the encryption key to obtain encrypted data. In this way, the data to be transmitted may be transmitted between a smart door lock and a mobile terminal in the form of ciphertext.

For example, if a visitor A wants to unlock a smart door lock to enter a house right now, a user may issue an unlock password to the smart door lock via a cloud server using the pre-installed smart door lock APP. The mobile terminal may act as the sending terminal, and the smart door lock may act as the receiving terminal. The mobile terminal may set the unlock password as the data to be transmitted, and determine the encrypted data by encrypting the data to be transmitted according to the preset encryption algorithm.

Alternatively, the mobile terminal may send a request to the smart door lock for issuing a key for unlocking via the cloud server through the pre-installed smart door lock APP. The mobile terminal may act as the receiving terminal, and the smart door lock may act as the sending terminal. When an instruction, such as a request for a Bluetooth key, sent by the mobile terminal is received, the smart door lock may generate a corresponding Bluetooth key as the data to be transmitted according to the instruction, and determine the encrypted data by processing the data to be transmitted according to the preset encryption algorithm.

As another example, the mobile terminal may send an instruction of a control request to the smart door lock through the pre-installed smart door lock APP. The mobile terminal may act as the sending terminal and the smart door lock may act as the receiving terminal. For example, the instruction of the control request from the mobile terminal may include controlling to add a password, a Bluetooth key, or the like; unlocking a lock remotely; deleting a password, a Bluetooth key, a fingerprint, etc. The instruction may be set as determining the encrypted data by encrypting the data to be transmitted using a preset encryption algorithm.

In some embodiments of the present disclosure, the smart door lock may act as the sending terminal, and send specified data (e.g., unlocking records, historical records, status of sensors on the door, and presence of anyone in the house (or room), etc.) to a specified mobile terminal according to a user's preset rule (e.g., sending every 12 h, uploading after each door unlocking, timed transmission, etc.). That is to say, the smart door lock may act as the sending terminal to encrypt the unlocking record to be transmitted according to a preset encryption algorithm to determine encrypted data, and to process the unlocking record according to a preset rule (e.g., sending every 12 h, uploading after each door opening, timing retransmission, etc.) to determine encrypted data.

Operation S104: the sending terminal may assign a unique identifier to the encrypted data.

Specifically, the sending terminal may determine the encrypted data with the unique identifier by assigning the unique identifier to the encrypted data. The unique identifier may represent an identity of the sending terminal, and be used to perform identifier matching in an authentication. The unique identifier may include, for example, a MAC address of the sending terminal, an IP address, a specific tag, a username or a user ID, or the like, or any combination thereof.

Operation S105: the sending terminal may send the encrypted data with the unique identifier to the receiving terminal.

In some embodiments, the sending terminal may send the encrypted data with the unique identifier to the receiving terminal through a preset communication channel or via a cloud server. The receiving terminal may be a mobile terminal or a smart door lock. The preset communication channel may be a short-range wireless communication channel or an NFC channel, include but not limited to one of a WIFI local area network, a Bluetooth channel, a Zigbee channel, or an NFC channel. A locally control of the smart lock system may be implemented through the preset communication channel and a remotely control of the smart lock system may be implemented through the cloud sever.

For example, if a visitor A wants to unlock a smart door lock to enter a house right now, the user may issue an unlock password to the smart door lock via a cloud server using a pre-installed smart door lock APP. The mobile terminal may act as the sending terminal, and the smart door lock may act as the receiving terminal. The mobile terminal may set an unlock password as data to be transmitted, and determine encrypted data by encrypting the data to be transmitted according to a preset encryption algorithm, and assign a unique identifier to the encrypted data, and send the encrypted data with the unique identifier to the smart door lock through the cloud server or the preset communication channel.

In some embodiments of the present disclosure, the smart door lock may act as the sending terminal, and send specified data (e.g., unlocking records) to a specified mobile terminal according to a user's preset rule (e.g., sending every 12 hours). That is to say, the smart door lock may act as the sending terminal to encrypt the unlocking records to be transmitted according to a preset encryption algorithm to determine encrypted data, process the unlocking records to form the encrypted data according to the preset rule (e.g., sending every 12 hours), assign a unique identifier, and sent the encrypted data with the unique identifier to the mobile terminal through the cloud server or the preset communication channel.

Operation S106: the receiving terminal may identify authentication based on the encrypted data with the unique identifier.

Specifically, the identifying authentication based on the encrypted data with the unique identifier by the receiving terminal may include the following operations.

Operation S1061: the receiving terminal may extract the unique identifier in the encrypted data with the unique identifier.

As a receiving terminal, the mobile terminal or the smart door lock may extract the unique identifier carried by the encrypted data with the unique identifier. For example, the sending terminal may send the encrypted data with the unique identifier, and the receiving terminal may extract the unique identifier (e.g., the extracted unique identifier may be a MAC address, an IP address, a specific tag, a user name or a user ID, etc. of the sending terminal).

Operation S1062: determine an encryption key corresponding to the unique identifier based on the unique identifier.

An encryption key corresponding to the unique identifier may be determined by performing a matching operation based on the extracted unique identifier. The mobile terminal or the smart door lock may both store a correspondence relationship between the unique identifier and the encryption key, and the encryption key corresponding to the unique identifier may be determined according to the matching operation of the unique identifier. For example, a correspondence relationship table between the unique identifier and the encryption key may be stored in both the mobile terminal and the smart door lock. When a matching search is performed based on the unique identifier, the corresponding encryption key may be determined.

Operation S1063: determine a result of an authentication based on the encryption key corresponding to the unique identifier.

Specifically, the receiving terminal may determine whether the encryption key determined by the matching operation is the same as or corresponds to an encryption key stored in the receiving terminal. If they are the same or correspond to each other, the result of the authentication may be that the encrypted data was sent by a paired sending terminal. As used herein, the paired sending terminal may represent a sending terminal that has been verified. If they are different or do not correspond to each other, the result of the authentication may be that the encrypted data was sent by an unpaired sending terminal. As used herein, the unpaired sending terminal may represent a sending terminal that has not been verified. In the present disclosure, an authentication operation may be applied to ensure and enhance security of the communication.

Operation S107: the receiving terminal may process the encrypted data according to the result of the identity authentication. The receiving terminal may be a mobile terminal or a smart door lock.

Specifically, if the result of the authentication identifying the encrypted data are sent from a paired sending terminal, decrypting and further processing may be performed. If the result of the authentication identifying the encrypted data are sent from an unpaired sending terminal, decrypting may not be performed and an alert may be generated.

In some embodiments, the alert may be presented in any form, for example, a text message, an audio signal, an optical signal, vibration, a haptic alert, or the like, or a combination thereof. The alert may be updated to a server or stored in the receiving terminal. The alert may be sent to another mobile terminal paired with the smart door lock, a third party, e.g., a police station, a security surveillance entity, etc., or a combination thereof.

The method of the present disclosure may also include the following operations.

Operation S101: in response to a user's authorization instruction, the smart door lock or the mobile terminal may generate an initial encryption key, and determine an encryption key by authenticating the initial encryption key.

The initial encryption key may be a key automatically generated by the smart door lock or the mobile terminal or manually inputted by the user. The initial encryption key may be transmitted through a secure communication channel. By this way, the smart door lock and the mobile terminal may both obtain the initial encryption key. The smart door lock and the mobile terminal may determine an encryption key by authenticating the initial encryption key.

Specifically, the user's authorization instruction may be provided by, for example, pressing a configuration key or a configuration mode touch key manually by the user, inputting a preset administrator password or inputting an administrator authority fingerprint locally in the smart door lock (i.e., the smart door lock enters a configuration mode). The user may open the APP on the terminal to enter the configuration mode, and the secure communication channel may be activated with the user's authorization through the configuration mode. The smart door lock and the mobile terminal may be connected through the secure communication channel using any one of a WIFI LAN network, a Bluetooth channel, a Zigbee channel, or an NFC channel. The initial encryption key may be generated by either of the smart door lock or the mobile terminal and the encryption key may be determined by authenticating mutually by the smart door lock and the mobile terminal. For example, the user may press a startup configuration key on the smart door lock and input an authenticated administrator password, meanwhile the user may open the smart door lock APP in the mobile terminal to enter the configuration mode. The smart door lock and the mobile phone may be connected and communicate through the Bluetooth channel with the user's authorization. The initial encryption key may be generated by the smart door lock and be transmitted to the smart door lock APP in the mobile terminal through the Bluetooth communication channel. The APP in the mobile terminal may confirm or modify the initial encryption key and exchange it with the smart door lock. Alternatively, the smart door lock and the mobile terminal APP may generate a pair of public key and a private key respectively and exchange them. In some embodiments, the public key generated by the smart door lock may be the same as the public key generated by the mobile terminal APP. In some embodiments, the public key generated by the smart door lock may be different from the public key generated by the mobile terminal APP. As used herein, a private key refers to a key that is privately kept on a certain device. As used herein, a public key refers to a key that may be openly distributed or shared among different users. In some embodiments, the public key may be used in encrypting data. The private key be used in decrypting the encrypted data. In some embodiments, encrypted data encrypted by a public key may only be decrypted by a corresponding private key.

In some embodiments, there may be multiple implementations for encrypted data to be transmitted. For example, symmetric encryption or asymmetric encryption may be used for encryption. The encryption and decryption processes of different encryption methods are described in detail below in conjunction with specific embodiments.

Figure 3:
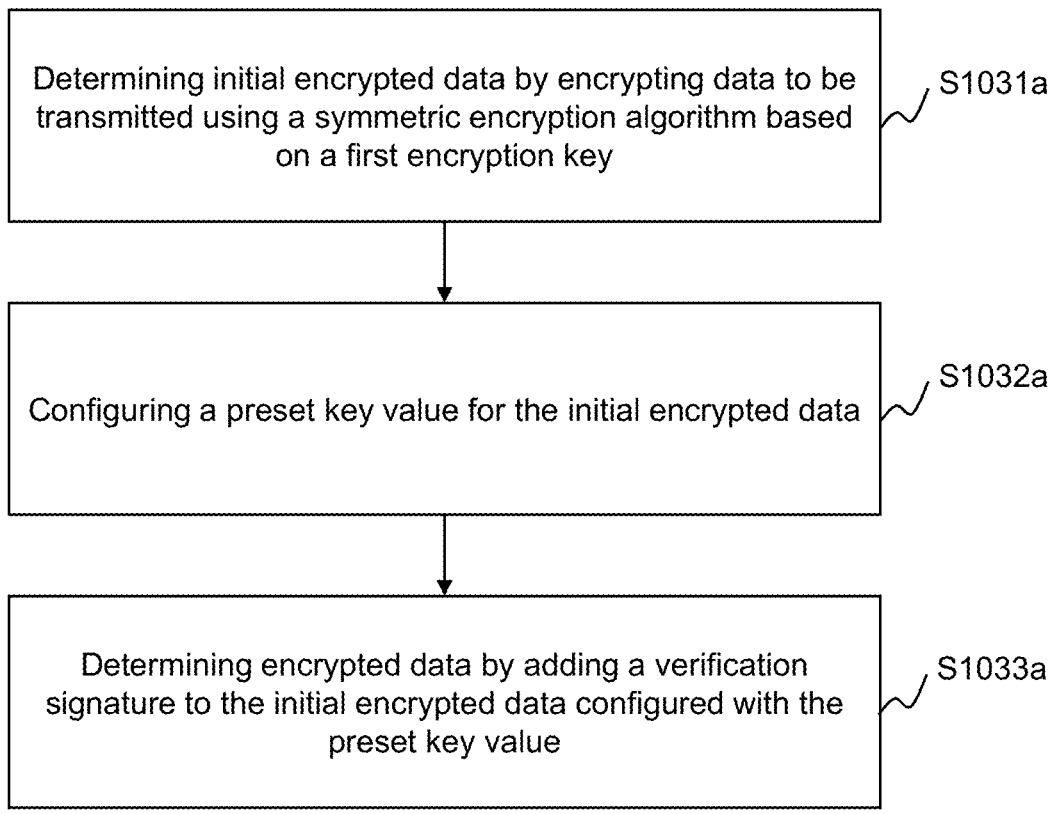
FIG. 3 is a schematic flowchart illustrating an exemplary embodiment of operation S103 of the present disclosure.

Optionally, as shown in FIG. 3, the encryption key may be a first encryption key. In the operation S103, the determining the encrypted data by decrypting the data to be transmitted using the preset encryption algorithm based on the encryption key may include the following operations.

Operation S1031a: determining initial encrypted data by encrypting the data to be transmitted using a symmetric encryption algorithm base on a first encryption key.

Specifically, the first encryption key may be an encryption key stored respectively in the smart door lock and the mobile terminal. For example, if the smart door lock is paired with two mobile terminals, a mobile terminal A and the smart door lock may store a same encryption key (e.g., Key A). A mobile terminal B and the smart door lock may store a same encryption key (e.g., Key B). In some embodiments, when the mobile terminal A is used as a sending terminal, initial encrypted data A may be determined by encrypting data to be transmitted, generated by the mobile terminal A, using the encryption key algorithm based on the encryption key "Key A". In some embodiments, the smart door lock is used as a sending terminal, initial encrypted data B may be determined by encrypting data to be transmitted using the encryption key algorithm based on the encryption key "Key B", wherein the data to be transmitted may be generated according to an instruction of request sent by the mobile terminal B.

Operation S1032a: configuring a preset key value for the initial encrypted data.

Specifically, the preset key value may be configured for the initial encrypted data determined by the above operations, where the preset key value may be at least one of a timestamp, a counter reading, or a random code. The timestamp may be a current timestamp (e.g., the date and/or time when an operation of interest (e.g., data encryption, a request to unlock a door) is performed). For example, if the current time is 2016-08-11-20:21, then it may be used as the preset key value and be configured into the initial encrypted data.

Operation S1033a: determining the encrypted data by adding a verification signature to the initial encrypted data configured with the preset key value.

The verification signature may be a hash value that may be generated according to the hash algorithm, wherein the verification signature may be used for verifying the integrity of the encrypted data upon decryption.

Figure 4:
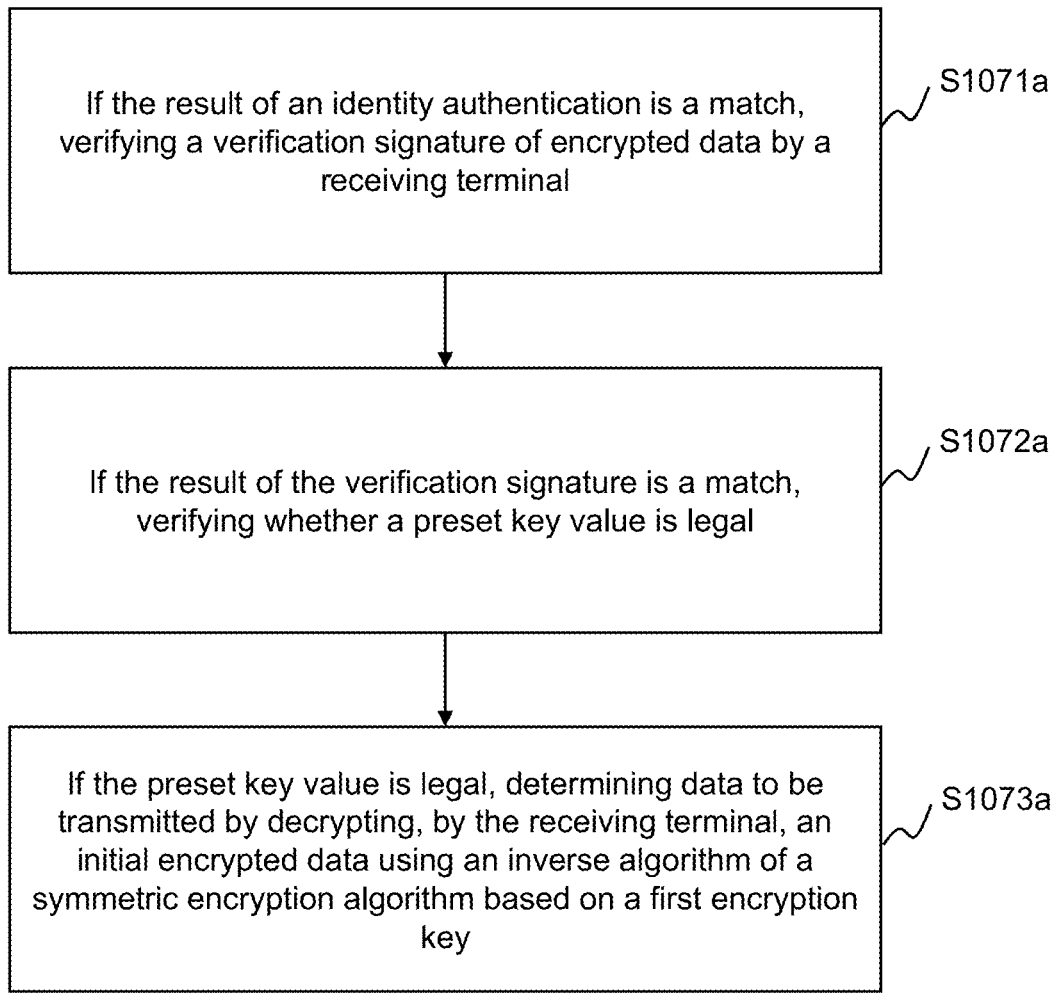
FIG. 4 is a schematic flowchart illustrating an exemplary embodiment of operation S107 of the present disclosure.

Optionally, as shown in FIG. 4: in the operation S107, the processing the encrypted data according to the result of the identify authentication may include the following operations.

Operation S1071a, if the result of the identity authentication is a match, the receiving terminal may verify the verification signature of the encrypted data. As used herein, the result of the identity authentication being a match may indicate that the encrypted data is sent from a paired or otherwise trustworthy sending terminal. An encryption key of the encrypted data determined in a matching operation may be the same as or correspond to the encryption key stored in the receiving terminal.

Specifically, the receiving terminal may verify the integrity of the verification signature, to prevent data tampering and ensure data integrity.

Operation S1072a, if a result of the signature verification is a match (i.e., the integrity of the signature verification being confirmed), the receiving terminal may verify whether the preset key value is legal. As used herein, the verification signature being a match may indicate that the encrypted data is sent from a paired or otherwise trustworthy sending terminal. A verification signature of the encrypted data may match a value determined by the receiving terminal. The value may be a timestamp, a counter reading, or a random code, or the like.

Specifically, if the verification signature matches, the receiving terminal may analyze whether the preset key value (e.g., the timestamp, the counter reading, or the random code) is legal. Specifically, the preset key value may be compared with local data in the receiving terminal, wherein the local data may be current data, or stored or generated by the receiving terminal. In some embodiments, when the smart door lock acts as the receiving terminal, the smart door lock may compare the timestamp with time data stored in a clock module of the smart door lock. The clock module may include a clock chip continuously powered by a button battery. For example, the smart door lock may be powered by a double-A dry battery. The operation of changing battery does not disrupt the normal operation of the clock inside the smart door lock. The clock module may update automatically according to a standard time. For example, the current time may be 17:00, and the time of the clock module may also be 17:00.

The smart lock may compare the timestamp with the time stored in the clock module of the smart door lock. If a deviation (i.e., a difference between the timestamp of the encrypted data and the time stored in the clock module) exceeds a threshold value, the encrypted data may be deemed to be an illegal data package. The verification result may be fed back to the mobile terminal through Bluetooth, Zigbee, or the like. Generally, the threshold value may be set within 15 minutes to 60 minutes according to the situation, for example, the threshold may be 20 minutes. If the deviation exceeds 20 minutes, the encrypted data may be deemed to be an illegal data package. A verification result may be that the encrypted data with the preset key value is illegal, and the verification result may be fed back to the mobile terminal through a preset communication channel or a cloud server.

If the deviation does not exceed the threshold value, the verification result may be that the encrypted data with the preset key value is legal. Similarly, when the mobile terminal acts as the receiving terminal, a comparing may be performed to a current time value of the mobile terminal, and details are not described herein.

In some embodiments, the preset key value may be a counter reading. When the smart door lock acts as the receiving terminal, the smart door lock may compare the counter reading of the encrypted data configured with the preset key value with a locally stored counter reading. The counter reading may be a represent of a number of unlock times corresponding to an encryption key.

If the counter reading of the encrypted data is greater than the locally stored counter reading, the verification result may be that an unlock verification code with the counter reading is legal. If the counter reading of the encrypted data is less than or equal to the locally stored counter reading, it may be considered that data packet of the encrypted data is replayed. A verification result may be that the encrypted data with the counter reading is illegal, and the verification result may be fed back to the mobile terminal through a preset communication channel or a cloud server. The mobile terminal may act the same as the receiving terminal and details are not described here.

Operation S1073a, if the preset key value is legal, the receiving terminal may determine data to be transmitted by decrypting the initial encrypted data using an inverse algorithm of the symmetric encryption algorithm based on the first encryption key.

Specifically, the receiving terminal may verify whether the preset key of the encrypted data configured with the preset key value is legal. If the preset key value is legal, the receiving terminal may determine the data to be transmitted by decrypting the initial encrypted data using the inverse algorithm of the symmetric encryption algorithm based on the first encryption key locally stored in the receiving terminal. For example, if a corresponding first encryption key stored locally is "Key A," the data to be transmitted may be obtained by decrypting the initial encrypted data based on "Key A" using the inverse algorithm of the symmetric encryption algorithm.

Optionally, an encryption key may include a public key and a private key. In the operation S103, the determining encrypted data by encrypting the data to be transmitted using the preset encryption algorithm based on the encryption key may include the following operations.

Operation S1031b: the sending terminal may determine initial encrypted data by encrypting the data to be transmitted using an asymmetric encryption algorithm based on the public key stored in the sending terminal.

Specifically, the encryption key stored respectively by the sending terminal and the receiving terminal may include a public key and a private key. The encryption key saved by the sending terminal may include a private key pri-A and a public key pub-B. At the same time, the corresponding encryption key stored by the receiving terminal may include a private key pri-B and a public key pub-A. For example, the encryption key saved by the smart door lock, acts as a sending terminal, may include the private key pri-A and the public key pub-B; the corresponding encryption key saved by the mobile terminal, acts as a receiving terminal, may include the private key pri-B and the public key pub-A. The smart door lock, acting as the sending terminal, may determine initial encrypted data by encrypting the data to be transmitted using the asymmetric encryption algorithm based on the public key pub-B stored in itself.

Operation S1032b: configuring a preset key value for the initial encrypted data. The preset key value may be at least one of a timestamp, a counter reading, or a random code. The timestamp may be a current timestamp (e.g., the date and time when an operation of interest is performed).

Specifically, the preset key value may be configured into the initial encrypted data determined through the above operations, where the preset key value may be at least one of a timestamp (e.g., a current timestamp), a counter reading, or a random code. For example, if the current time is 2016-08-11-20:21, a timestamp may be set as the preset key value and be configured into the initial encrypted data.

Operation S1033b: determining the encrypted data by adding a verification signature to the initial encrypted data configured with the preset key value, wherein the verification signature is the private key stored in the sending terminal.

Specifically, as described above, the encryption key stored by the sending terminal may include a private key pri-A and a public key pub-B. At the same time, the corresponding encryption key stored by the receiving terminal may include a private key pri-B and a public key pub-A. For example, the encryption key stored by the smart door lock as the sending terminal may include the private key pri-A and the public key pub-B, the corresponding encryption key stored by the mobile terminal as the receiving terminal may include the private key pri-B and the public key pub-A. For example, if the smart door lock acts as the sending terminal, the encrypted data may be determined by adding a verification signature to the initial encrypted data with the preset key value, wherein the verification signature may be the private key pri-A stored by the smart door lock.

Optionally, in the operation S107, the processing the encrypted data according to the result of the identity authentication may include the following operations.

Operation S1071b, if the result of the identity authentication is a match, the receiving terminal may verify the verification signature of the encrypted data using the public key stored by the receiving terminal. As used herein, the result of the identity authentication being a match may indicate that the encrypted data is sent from a paired or otherwise trustworthy sending terminal. An encryption key of the encrypted data determined in a matching operation may be the same as or correspond to the encryption key stored in the receiving terminal.

Specifically, if the result of the identity authentication is a match, the receiving terminal may verify the verification signature of the encrypted data using the public key stored locally in the receiving terminal. For example, the receiving terminal may be a mobile terminal. As described above, the encryption key stored locally in the mobile terminal may include a private key pri-B and a public key pub-A. Then, the mobile terminal may use the locally stored public key pub-A to verify a verification signature pri-A carried in the encrypted data. If it is verified that the pri-A is corresponding to the locally stored public key pub-A, the verification signature matches. If it is verified that it is not a private key corresponding to the locally stored public key pub-A, the result of the verification signature is not matching.

Operation S1072b: if the result of the signature verification is a match, the receiving terminal may verify whether the preset key value is legal. As used herein, the verification signature being a match may indicate that the encrypted data is sent from a paired or otherwise trustworthy sending terminal. A verification signature of the encrypted data may match a value determined by the receiving terminal. The value may be a timestamp, a counter reading, or a random code, or the like.

Specifically, if the result of the signature verification is a match, the receiving terminal may analyze whether the preset key value (e.g., the timestamp, the counter reading, or the random code) is legal. Specifically, the preset key value may be compared with local data in the receiving terminal, wherein the local data may be current data, or stored or generated by the receiving terminal. In some embodiments, when the smart door lock acts as the receiving terminal, the smart door lock may compare the timestamp with time data stored in a clock module of the smart door lock. The clock module may include a clock chip continuously powered by a battery. For example, a smart door lock may be powered by a double-A dry battery. The operation of changing battery does not disrupt the normal operation of the clock inside the door lock. The clock module may be updated automatically according to a standard time. For example, the current time may be 17:00, and the time of the clock module may also be 17:00.

The smart lock may compare the timestamp with the time stored in the clock module of the smart door lock. If a deviation (i.e., a difference between the timestamp of the encrypted data and the time stored in the clock module) exceeds a threshold value, the encrypted data may deemed to be an illegal data package. The verification result may be fed back to the mobile terminal through Bluetooth, Zigbee, or the like. Generally, the threshold value may be set within 15 minutes to 60 minutes according to the situation. For example, the threshold may be 20 minutes. If the deviation exceeds 20 minutes, the encrypted data may be deemed to include an illegal data package. A verification result may be that the encrypted data with the preset key value is illegal, and the verification result may be fed back to the mobile terminal through a preset communication channel or a cloud server.

If the deviation does not exceed the threshold, the verification result may be that the encrypted data with the preset key value is legal. Similarly, when the mobile terminal acts as the receiving terminal, a comparison may be performed to a current time value of the mobile terminal, and details are not repeated herein.

In some embodiments, the preset key value may be a counter reading. When the smart door lock acts as the receiving terminal, the smart door lock may compare the counter reading of the encrypted data configured with the preset key value with a locally stored counter reading.

If the counter reading of the encrypted data is greater than the locally stored counter reading, the verification result may be that an unlock verification code with the counter reading is legal. If the counter reading of the encrypted data is less than or equal to the locally stored counter reading, it may be considered that data packet of the encrypted data is replayed. A verification result may be that the encrypted data with the counter reading is illegal, and the verification result may be fed back to the mobile terminal through a preset communication channel or a cloud server. The mobile terminal may be the same as the receiving terminal and details are not repeated here.

Operation S1073b: If the preset key value is legal, the receiving terminal may determine data to be transmitted by decrypting the initial encrypted data using an inverse algorithm of the same symmetric encryption algorithm based on the private key stored by itself.

Due to encryption of the data to be transmitted, adding a preset key value to prevent replaying, configuring a verification signature to prevent data tampering by any unauthorized person and ensure data integrity, or the like, which may all be done locally, no one can obtain user's information to be transmitted from a server, even if an internal staff member of the server or a smart door lock manufacturer. Accordingly, even if the server is compromised, identity authentication, anti-replay, and anti-tampering in the communication between the door lock and the mobile terminal may remain in effect, and security of the user information may be protected effectively.

Operation S1071a-S1073a and operation S1071b-S1073b are some specific embodiments for decrypting the encrypted data by the receiving terminal. In some embodiments of the present disclosure, the receiving terminal may receive the encrypted data with the unique identifier sent by the sending terminal and determine a result of an identity authentication by performing the identity authentication on the encrypted data with the unique identifier. The receiving terminal may obtain data to be transmitted by decrypting the encrypted data based on the encryption key obtained from a key exchange process according to the result of the identity authentication. The manner of decrypting the encrypted data may be different depending on the encryption methods of the encrypted data. The embodiments of the present disclosure do not limit this.

In some cases, when a user loses his/her mobile terminal, a deletion operation may still be initiated to instruct the smart door lock and/or the cloud server to delete the relevant encryption key information by logging into a backup mobile terminal. It may prevent leakage of the encryption key information in the lost mobile terminal, and reduce security risks.

Optionally, the secure communication method based on the smart door lock system may further include the following operations.

Operation 1081: a backup mobile terminal may obtain account login verification information, wherein the account login verification information may be information for verifying the identity of a user, and the backup mobile terminal may be a backup device of the mobile terminal. As used herein, the backup device of the mobile terminal may be any device selected by the user.

In some embodiments of the present disclosure, when the user loses a mobile terminal pre-installed with an APP and stored an encryption key, the user may login through a backup mobile terminal pre-installed with the smart door lock APP by inputting account login verification information. Wherein, the account login verification information may include, but is not limited to, user identity information (user identity information set by the user according to some rules, such as user name, user ID, etc.), a password, a verification code, or the like.

Operation 1082: if the account login verification information is verified, the backup mobile terminal, in response to an authorization of a deletion operation by the user, may send a first delete instruction to a smart door lock to instruct the smart door lock to delete its locally stored specified encryption key information, and/or, the backup mobile terminal, in response to a remote authorization of a deletion operation by the user, may send a second deletion instruction to the cloud server to instruct the cloud server to delete encryption key information stored in a mobile terminal.

Specifically, after passing an account login verification, user's terminal device may connect to the smart door lock through a short-range wireless communication or an NFC connection, and control the smart lock to delete original encryption key information corresponding to the account. At the same time, an encryption key stored in a lost mobile terminal may be deleted through some operations performed via a cloud server.

The above descriptions are some embodiments of a secure communication method provided in the present disclosure. For ease of understanding, embodiments of the present disclosure will be described below in conjunction with specific scenarios. Embodiment 1 is an application scenario in which a mobile terminal acts as a sending terminal, and an unlocking password is sent to the smart door lock to implement unlocking. Embodiment 2 is an application scenario in which a smart door lock acts as a sending terminal, and an unlocking record, a sensor state, or the like are sent to a specified mobile terminal according to a preset rule. The implementation processes are described in detail below.

EXAMPLE 1

A secure communication method applicable in a smart door lock system, including the following operations.

(1) In response to a user's authorization instruction, a smart door lock and a mobile terminal may respectively open a secure communication channel;

wherein the secure communication channel may be a communication channel activated by the authorization of the smart door lock and the mobile terminal.

The smart door lock or the mobile terminal may generate an initial encryption key, and determine an encryption key by authenticating the initial encryption key, wherein the initial encryption key may be a key automatically generated by the smart door lock or the mobile terminal or manually inputted by the user.

Specifically, the user's authorization instruction may be, for example, pressing a configuration key or a configuration mode touch key manually by the user, inputting a preset administrator password or inputting an administrator authority fingerprint locally in the smart door lock (i.e., the smart door lock enters a configuration mode). The user may open the APP in the mobile terminal to enter the configuration mode, and the secure communication channel may be activated with the user's authorization through the configuration mode. The smart door lock and the mobile terminal may be connected through the secure communication channel using any one of the WIFI LAN, Bluetooth, Zigbee or NFC. The initial encryption key may be generated by either of the smart door lock or the mobile terminal and the encryption key may be determined by authenticating mutually by the smart door lock and the mobile terminal. For example, the user may press a startup configuration key on the smart door lock and input an authenticated administrator password, meanwhile the user may open a smart door lock APP in the mobile terminal to enter the configuration mode. The smart door lock and the mobile phone may be connected through the Bluetooth with the user's authorization. The initial encryption key may be generated by the smart door lock and be transmitted to the smart door lock APP in the mobile phone through the Bluetooth communication channel. The APP in the mobile phone may confirm or modify the initial encryption key and exchange it with the smart door lock. Alternatively, the smart door lock and the mobile phone APP may respectively generate a pair of public key and a private key and exchange them.

(2) The smart door lock and the mobile terminal may activate Bluetooth communication, and the smart door lock and a smart door lock APP pre-installed in the mobile terminal may exchange an encryption key via the Bluetooth communication.

(3) When the mobile terminal is used as the sending terminal, the data to be transmitted may be generated according to the unlock password of the smart door lock APP preset in the mobile terminal. Encrypted data may be determined by encrypting the data to be transmitted using a preset encryption algorithm based on an encryption key. Specifically, the same encryption key "Key A" and the same symmetric encryption algorithm are built in the smart door lock APP preinstalled in the smart door lock and the mobile terminal. The mobile terminal may be used as the receiving terminal, and the smart door lock may be used as the receiving terminal. The mobile terminal may set a password as the data to be transmitted, and then initial encrypted data A may be determined by encrypting the data to be transmitted using the encryption key algorithm based on the encryption key "Key A". The initial encrypted data A may be configured with a preset key value, wherein the preset key value may be a timestamp. Encrypted data may be determined by adding a verification signature to the initial encrypted data configured with the preset key value.

(4) The mobile terminal may assign a unique identifier to the encrypted data. The unique identifier may be a user ID of the mobile terminal pre-configured with a smart door lock APP.

(5) The mobile terminal may send the encrypted data with the unique identifier to the smart door lock via a cloud server.

(6) The smart door lock that receives the encrypted data may perform identity verification on the encrypted data with the unique identifier. Specifically, the unique identifier may be extracted, by the smart door lock which is acting as a receiving terminal, from encrypted data with the unique identifier. For example, a sending terminal may send encrypted data with a unique identifier, and a receiving terminal may extract the unique identifier (e.g., a MAC address, an IP address, a specific tag, a user name or a user ID, or the like of the sending terminal). An encryption key corresponding to the unique identifier may be determined according to a matching operation. Wherein both the smart door lock and the mobile terminal may store a correspondence relationship of the unique identifier and the encryption key. The encryption key corresponding to the unique identifier may be determined according to a unique identifier matching based on the correspondence relationship. For example, a correspondence relationship table between the unique identifier and the encryption key may be stored on both the mobile terminal and the smart door lock. When a matching search is performed according to the unique identifier, a corresponding encryption key may be determined. Result of an identity authentication may be determined, by the receiving terminal, according to the encryption key corresponding to the unique identifier. Specifically, the receiving terminal may determine whether the encryption key determined in the matching is the same as or corresponding to the encryption key stored in the receiving terminal. If they are the same or match, the result of the identity authentication may be that the encrypted data are sent by a paired sending terminal. If they are not the same or do not match, the result of the identity authentication may be that the encrypted data are sent by the unpaired sending terminal. Security of the communication may be enhanced through the identity authentication operation.

(7) If the result of the identity authentication is a match, the receiving terminal may verify a verification signature of the encrypted data. The receiving terminal may verify integrity of the signature, to prevent tampering and ensure data integrity. Specifically, if the result of the signature verification is a match, the smart door lock may compare a timestamp with a time stored by a clock module in a smart door lock. A clock chip inside the clock module may be powered by a button battery continuously. For example, a smart door lock may be powered by a double-A dry battery. Even after replacing the double-A battery, the clock inside the door lock may keep running properly. Time of the clock module may be updated automatically according to the standard time. For example, the current time may be 17:00, and the time of the clock module may also be 17:00.

The smart lock may compare the timestamp with the time stored in the clock module of the smart door lock. If a deviation (i.e., a difference between the timestamp of the encrypted data and the time stored in the clock module) exceeds a threshold value, the encrypted data may be determined to be an illegal data package. The verification result may be fed back to the mobile terminal through Bluetooth or Zigbee or the like. Generally, the threshold value may be set within 15 minutes to 60 minutes according to the situation, for example, the threshold may be 20 minutes. If the deviation exceeds 20 minutes, it may be determined that the encrypted data is an illegal data package. A verification result may be that the encrypted data with the preset key value is illegal, and the verification result may be fed back to the mobile terminal through a preset communication channel or a cloud server.

If the deviation does not exceed the threshold value, the verification result may be that the encrypted data with the preset key value is legal. If the preset key value is legal, the smart lock may determine data to be transmitted by decrypting the initial encrypted data based on the same first encryption key "Key A" saved locally using an inverse algorithm of the same symmetric encryption algorithm.

EXAMPLE 2

A secure communication method based on the smart door lock system, including the following operations.

(1) In response to a user's authorization instruction, a smart door lock and a mobile terminal may respectively activate a secure communication channel, and the secure communication channel may be a communication channel activated by the authorization of the smart door lock and the mobile terminal.

The smart door lock or the mobile terminal may generate an initial encryption key, and the smart door lock and the mobile terminal may determine an encryption key by authenticating the initial encryption key. The initial encryption key may be a key automatically generated by the smart door lock or the mobile terminal or manually inputted by the user.

Specifically, the user's authorization instruction may be, for example, pressing a configuration key or a configuration mode touch key manually by the user, inputting a preset administrator password or inputting an administrator authority fingerprint locally in the smart door lock (i.e., the smart door lock enters configuration mode). The user may open an APP in the mobile terminal to enter a configuration mode, and a secure communication channel may be triggered with the user's authorization through the configuration mode. The smart door lock and the mobile terminal may be connected through the secure communication channel using any one of a WIFI LAN network, a Bluetooth channel, a Zigbee channel, or an NFC channel. The initial encryption key may be generated by either of the smart door lock or the mobile terminal and an encryption key may be determined by authenticating mutually by the smart door lock and the mobile terminal. For example, the user may press a startup configuration key on the smart door lock and input an authenticated administrator password, meanwhile the user may open a smart door lock APP in the mobile terminal to enter the configuration mode. The smart door lock and the mobile phone may be connected through the NFC channel with the user's authorization. The smart door lock and the mobile phone APP may respectively generate a pair of a public key and a private key and exchange them through the NFC channel.

(2) The smart door lock and the smart door lock APP pre-installed in the mobile terminal may be connected and exchange an encryption key via the NFC channel.

(3) When the smart door lock is used as a sending terminal, for example, specified data (e.g., unlocking records, historical records, sensor status of the door, and even the presence of anyone in the house, etc.) may be sent to a specified mobile terminal according to a user's preset rule (e.g., sending every 12 h, uploading after each door opening, timing retransmission, etc.). That is, the smart door lock may act as the sending terminal to determine encrypted data by encrypting the unlocking record to be sent using a preset encryption algorithm. Specifically, an encryption key saved by the smart door lock as the sending terminal may include a private key pri-A and a public key pub-B and an asymmetric encryption algorithm, a corresponding encryption key saved by the mobile terminal as the receiving terminal may include a private key pri-B and a public key pub-A and the same asymmetric encryption algorithm. The smart door lock may act as the sending terminal to encrypt the data to be transmitted using the asymmetric encryption algorithm based on the public key pub-B stored in itself to determine initial encrypted data, to configure the initial encrypted data with a counter reading as a preset key value to determine the initial encrypted data configured with the preset key value, to add the private key as the verification signature to the initial encrypted data configured with the preset key value to determine the encrypted data. Specifically, as described above, the encryption key saved by the sending terminal may include a private key pri-A and a public key pub-B. Then, the corresponding encryption key stored in the receiving terminal may include a private key pri-B and a public key pub-A. For example, the encryption key saved by the smart door lock as the sending terminal may include the private key pri-A and the public key pub-B, the corresponding encryption key saved by the mobile terminal as the receiving terminal may include the private key pri-B and the public key pub-A. If the smart door lock is used as the sending terminal, encrypted data may be determined by adding a verification signature to the initial encrypted data with the preset key value, wherein the verification signature may be the private key pri-A stored in the smart door lock.

(4) The smart door lock may configure a unique identifier for encrypted data. The unique identifier may be an MAC address of the smart door lock.

(5) The smart door lock may send encrypted data with the unique identifier to the mobile terminal via a cloud server.

(6) The mobile terminal that receives the data may perform identity verification on the encrypted data with the unique identifier. Specifically, the smart door lock may be used as the receiving terminal to extract a unique identifier, wherein the unique identifier may be in the encrypted data. For example, the sending terminal may send the encrypted data with a unique identifier, and the receiving terminal may extract the unique identifier (e.g., a MAC address, an IP address, a specific tag, a user name or a user ID, or the like of the sending terminal). The receiving terminal may determine an encryption key corresponding to the unique identifier by performing a unique identifier matching based on the extracted unique identifier. Wherein, the mobile terminal or the smart door lock may both store a correspondence relationship between the unique identifier and the encryption key, and the encryption key corresponding to the unique identifier may be determined according to the unique identifier matching. For example, a correspondence relationship table between the unique identifier and the encryption key may be stored on both the mobile terminal and the smart door lock. When a matching search is performed according to the unique identifier, a corresponding encryption key may be determined. The receiving terminal may determine, according to the encryption key corresponding to the unique identifier, a result of an identity authentication. Specifically, the receiving terminal may determine whether the encryption key determined in the matching is the same as or corresponding to the encryption key stored in the receiving terminal. If they are same or match, the result of the identity authentication may be that the encrypted data are sent by a paired sending terminal. If they are not same or do not match, the result of the identity authentication may be that the encrypted data are sent by the unpaired sending terminal. Security of the communication may be enhanced through the identity authentication operation.

(7) If the result of the identity authentication is a match, the receiving terminal may verify a verification signature of the encrypted data based on a stored public key. Specifically, if the result of the identity verification is a match, the receiving terminal may verify the verification signature of the encrypted data based on the locally stored public key. For example, the receiving terminal may be a mobile terminal. As described above, the encryption key stored locally in the mobile terminal may include a private key pri-B and a public key pub-A. Then, the mobile terminal may use the locally stored pub-A to verify the signature pri-A carried in the encrypted data. If it is verified that it is a private key pri-A corresponding to the locally stored public key pub-A, the verification signature is a match. If it is verified that it is not a private key corresponding to the locally stored public key pub-A, the result of the verification signature is not a match. If the result of the signature verification is a match, when the mobile terminal is used as the receiving terminal, the mobile terminal may compare a counter reading of the encrypted data configured with a preset key value with a locally stored counter reading.

If the counter reading of the encrypted data is greater than the locally stored counter reading, a verification result may be that an unlock verification code with the counter reading is legal. If the counter reading of the encrypted data is less than or equal to the locally stored value, it may be considered that the data packet is replayed. The verification result may be that the encrypted data with the counter reading is illegal, and the verification result may be fed back to the smart door lock through a preset communication channel or a cloud server to generate alert information. If the preset key value is legal, the receiving terminal may determine data to be transmitted by decrypting the initial encrypted data using an inverse algorithm of the same symmetric encryption algorithm based on the private key. The serial number of the present disclosure is for illustrative purposes only and does not represent the advantages and disadvantages of the embodiments.

It should be noted that the above descriptions of the smart lock system are intended to be illustrative, and not to limit the scope of the present disclosure. The above descriptions of the smart lock system may be applied in a variety of scenarios including, e.g., a vehicle, a door, a building, an intelligent home, or the like. The secure communication methods disclosed herein may be applied in a variety of scenarios including, e.g., access authentication in data exchange, key exchange, device-to-device communication; or multi-device-to-multi-device communication, or the like.

The communication methods may be used to facilitate secure communication between at least two devices, e.g., between an application device and a control device (e.g., a mobile device or a mobile terminal), between two control devices, between two application devices, etc.

Figure 5:
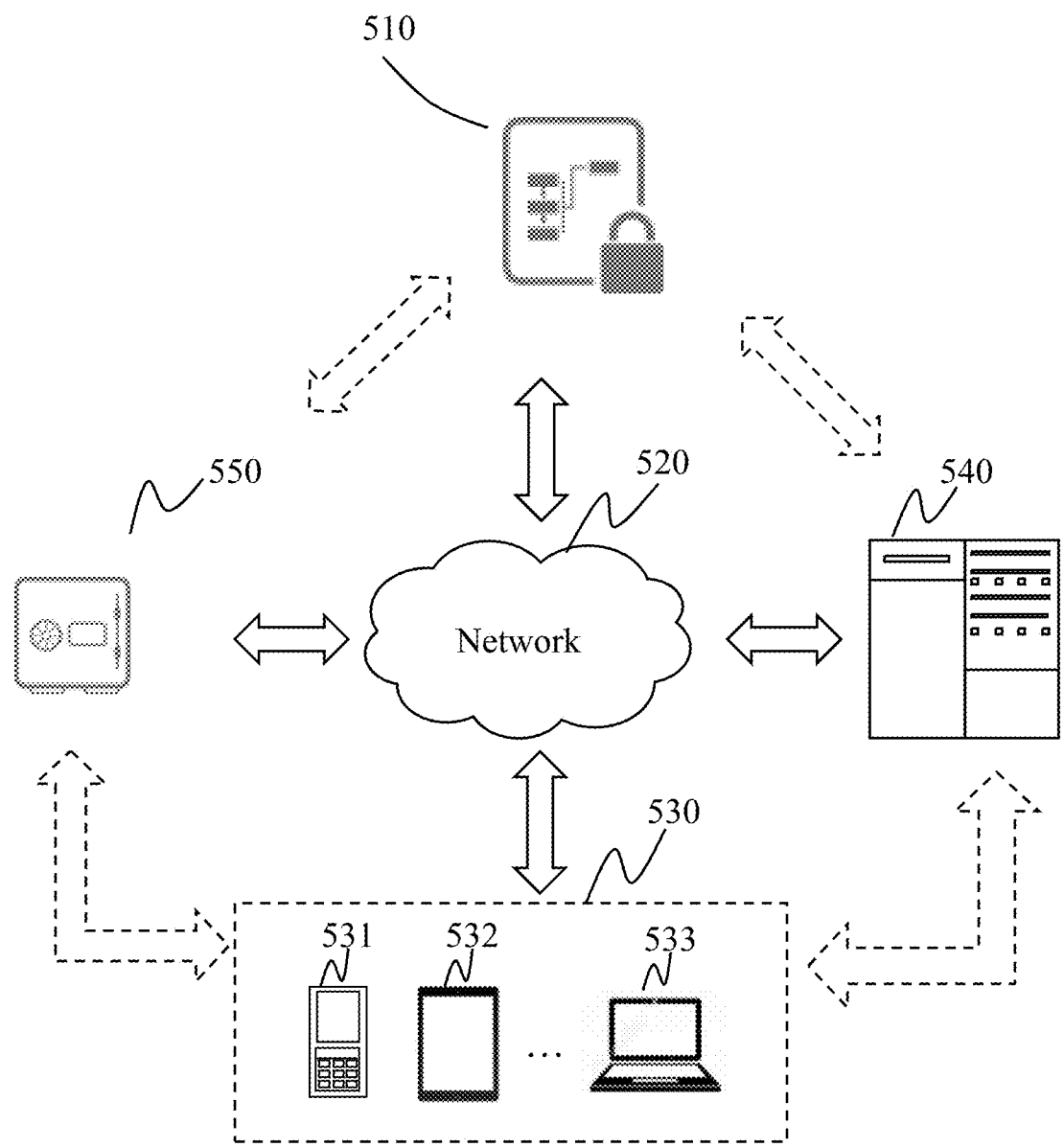
FIG. 5 is a schematic diagram illustrating an exemplary smart lock system according to some embodiments of the present disclosure.

FIG. 5 is a schematic diagram illustrating an exemplary smart lock system according to some embodiments of the present disclosure. As illustrated, the smart lock system 500 may include a first device 510, a network 520, a second device 530, a processing device 540, and a third device 550. The components of the smart lock system 500 may be connected in one or more of various ways. For example, the first device 510 may be connected to the processing device 540 through the network 520. As another example, the first device 510 may be connected to the processing device 540 directly (as indicated by the bi-directional arrow in dotted lines linking the first device 510 and the processing device 540). As a further example, the second device 530 may be connected to the processing device 540 directly (as indicated by the bi-directional arrow in dotted lines linking the second device 530 and the processing device 540) or through the network 520. As still a further example, the third device 550 may be connected to the first device 510 directly or through the network 520.

In some embodiments, the secure communication methods disclosed in the present disclosure may be used in the smart lock system 500. For example, one or more components (e.g., the first device 510, the second device 530, the processing device 540, the third device 550) of the smart lock system 500 may communicate with one or more other components of the smart lock system 500. Data to be transmitted between each two components during the communication may be encrypted and/or decrypted according to the secure communication methods.

The first device 510 may include a smart lock that is operably installed (or referred to as installed for brevity) on a door to a confined space. As used herein, a confined space refers to a space or cavity access to which is controlled. For instance, access to a confined space may be controlled via, e.g., a door with a smart lock. Exemplary confined spaces may include a container (e.g., a box, a closet, a locker, etc.), a room, or the like. In some embodiments, the door (or a cover) of the confined space may be operable to allow or prevent access to the confined space. For example, a user may open the door to the confined space such that the confined space is accessible. In some embodiments, the smart lock installed on the door may be operable to control the accessibility of the confined space. For example, the smart lock may be operated (e.g., remotely controlled by the second device or manually) to lock the door to the confined space such that the confined space is inaccessible. That is, the confined space is only accessible when the door is unlocked.

In some embodiments, the first device 510 may transmit data and/or information relating to the first device 510, the door, or the confined space to other components (e.g., the second device 530, the processing device 540, the third device 550, etc.) of the smart lock system 500. For example, the first device 510 may transmit status information (e.g., an image, a video) relating to at least one of the first device 510, the door, or the confined space to the second device 530. The status information may be further displayed by the second device 530 to a user of the second device 530. As another example, when a change in the accessibility of the confined space occurs, a signal may be transmitted from the first device 510 to the third device 550 so as to make a change to the third device 550. More descriptions regarding the first device 510 may be found elsewhere in the present disclosure. See, e.g., FIG. 6, and relevant descriptions thereof.

The network 520 may include any suitable network that can facilitate the exchange of information and/or data for the smart lock system 500. In some embodiments, one or more components (e.g., the first device 510, the second device 530, the processing device 540, the third device 550) of the smart lock system 500 may communicate with one or more other components of the smart lock system 500 via the network 520.

The second device 530 may include a mobile device 131 (or control device), a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart alert device, a smart lighting device, a control device (e.g., a keypad, a remote control) of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. In some embodiments, the first device 510, the processing device 540, and/or the third device 550 may be remotely controlled by the second device 530. In some embodiments, the first device 510, the processing device 540, and/or the third device 550 may be controlled by the second device 530 via a wireless connection. In some embodiments, the second device 530 may receive information and/or instructions inputted by a user, and send the received information and/or instructions to the first device 510, the processing device 540, or the third device 550 via the network 520. In some embodiments, the second device 530 may receive data and/or information from the processing device 540.

The processing device 540 may process data and/or information obtained from the first device 510, the second device 530, the third device 550, and/or any other components in communication with the smart lock system 500. For example, the first device 510 may include an interaction assembly configured to exchange interaction information relating to an interaction between a user and the first device 510 (or the door, the confined space). The processing device 540 may obtain the interaction information from the first device 510. Further, the processing device 540 may process the interaction information and generate a reminder. The reminder may be transmitted to other components (e.g., the second device 530) of the smart lock system 500 for further processing. In some embodiments, the processing device 540 may be a single server or a server group. In some embodiments, the processing device 540 may be local or remote. In some embodiments, at least a portion of the processing device 540 may be implemented on a computing device of the first device 510 and/or a computing device of the second device 530.

The third device 550 may be associated with one or more components (e.g., the first device 510, the second device 530) of the smart lock system 500. In some embodiments, the third device 550 may include a private device belonging to a user (or another user designated by the user) of the first device 510 or the second device 530. For example, the third device 550 may include a smart home device, a wearable device, a smart mobile device, a virtual reality device, an augmented reality device, or the like, or any combination thereof. In some embodiments, the third device 550 may include a device belonging to an agency (e.g., a police station, a security company, etc.) that provides relevant services, e.g., security services. In some embodiments, the smart lock system 500 may make a change to the third device 550 when a change in the accessibility of the confined space occurs. For example, the confined space may be a room, and the third device 550 may be a locker, a window, or a safe (e.g., a gunsafe) placed in the room. When the smart lock installed on a door of the room is unlocked, the room may be accessible. The smart lock installed on the door may generate a reminder (or an instruction) to the locker to lock the door of the locker. As another example, the confined space may be a container secured to a fixed position, and the third device 550 may be a smart alert device near the container. When a location of the container changes, the smart lock installed on a cover of the container may generate a reminder (or an instruction) to the smart alert device. The smart alert device may generate or play an alert in one or more of various forms (e.g., light, vibrations, voices, etc.) based on the reminder. In some embodiments, the smart lock installed on the cover of the container may also generate a reminder to the second device 530 upon the change of the location. The user of the second device 530 may input an instruction to make a change to the third device 550 (e.g., stop playing the alert).

In some embodiments, the smart lock system 500 may further include one or more power supplies (not shown in FIG. 5) connected to one or more components (e.g., the first device 510, the processing device 540, the second device 530, the third device 550) of the smart lock system 500.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the second device 530 and/or the third device 550 may be removed from the smart lock system 500. That is, the second device 530 and/or the third device 550 may be used as external devices of the smart lock system 500. The first device 510 may be operably connected (or referred to as connected for brevity) to the second device 530 and/or the third device 550. In some embodiments, the smart lock system 500 may include two or more confined spaces. Correspondingly, two or more first devices 510 may be operably installed on the doors to the confined spaces, respectively. The two or more first devices 510 may be operated independently (e.g., by two or more second devices 530) or controlled in a synchronized manner by one or more computing devices to control accessibilities of the corresponding confined spaces. In some embodiments, the smart lock system 500 may include two or more second devices 530. The first device 510 may transmit data and/or information (e.g., a same remainder or different remainders) to the two or more second devices 530. Optionally or additionally, the two or more second devices 530 may have different operation rights to the smart lock system 500.

Figure 6:
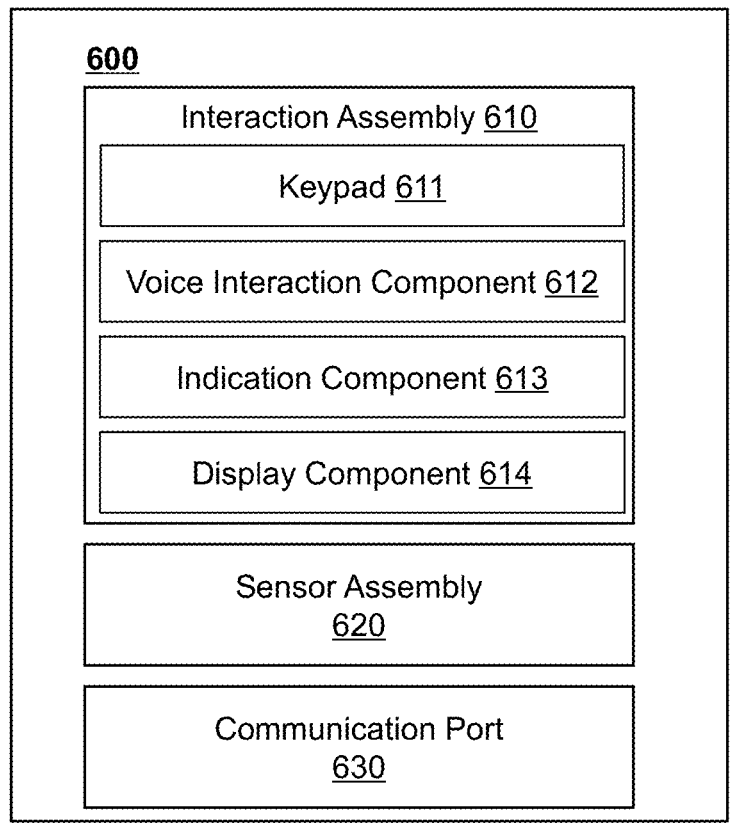
FIG. 6 is a schematic diagram illustrating exemplary components of an exemplary first device according to some embodiments of the present disclosure.

FIG. 6 is a schematic diagram illustrating exemplary components of an exemplary first device according to some embodiments of the present disclosure. The first device 600 may include a smart lock disclosed in the present disclosure. The smart lock may be installed on a door (or a cover) to a confined space (e.g., a container, a room, etc.). In some embodiments, the confined space may have different configurations depending on actual needs. For example, the confined spaces may have different sizes for accommodating items of different sizes. As another example, the confined spaces may have different temperatures to store items of different properties. In some embodiments, the smart lock may be operable to control access to the confined space. For example, the smart lock may be operated to lock the door to the confined space such that the confined space is inaccessible. As another example, the smart lock may be operated to unlock the door to the confined space such that the confined space is accessible. In some embodiments, the smart lock may be operated by a user (e.g., an owner of the confined space, a carrier, etc.) manually. In some embodiments, the smart lock may be operated by a device (e.g., the second device 530 illustrated in FIG. 5) remotely. In some embodiments, when operated by the device remotely, a communication between the smart lock and the device may be implemented using the secure communication method of the present disclosure.

As illustrated in FIG. 6, the first device 600 may include an interaction assembly 610, a sensor assembly 620, and a communication port 630.

The interaction assembly 610 may be configured to exchange interaction information relating to an interaction between a user and the first device 600, the door, or the confined space. In some embodiments, the interaction assembly 610 may include a keypad 611, a voice interaction component 612, an indication component 613, and a display component 614.

The keypad 611 may be configured to control the first device 600, the door, or the confined space by facilitating an interaction between the user and the first device, the door, or the confined space. The user may input an instruction (e.g., an unlock password, a remote call instruction, an instruction for activating a configuration mode for generating and exchanging an encryption key, etc.) to the first device 600 (or the door, the confined space) through the keypad 611 to control an operation of the first device 600. In some embodiments, the keypad 611 may include physical keys and/or virtual keys. For example, the physical keys may be disposed outside the confined space (e.g., on the door, on an outer wall of the confined space). The virtual keys may be disposed on a touch screen of the display component 614.

The voice interaction component 612 may be configured to facilitate a voice interaction between the user and the first device 600. In some embodiments, the voice interaction component 612 may include one or more microphones, one or more speakers, or the like. The one or more microphones may receive and/or process a voice instruction from the user. The voice instruction may be transmitted to a computing device of the first device 600 or a computing device of a second device. Further, an audio signal may be generated by the computing device of the first device 600 or the second device. For example, the computing device may perform a speech recognition on the voice instruction, and identify a corresponding instruction or information from a storage device of the first device 600 based on the recognition result. The audio signal may be played by the one or more speakers.

Merely by way of example, the computing device may unlock the first device 600 based on the recognition result. In some embodiments, information (e.g., a prompt to ask the user to provide authentication information, login information, confirmation of an input, information regarding a failed authentication attempt, etc.) from the first device 600 (or another device of or communicating with the first device 600) may be converted to an audio signal to be played by the voice interaction component 612 to the user. For example, the voice instruction transmitted to the second device in communication with the first device 600 may trigger a prompt for an instant voice communication between the second device and the first device 600.

The indication component 613 may be configured to indicate a working status of the first device 600. In some embodiments, the indication component 613 may include an indicator. The indicator may emit light of different colors and/or blink for different times to indicate different statuses of the first device 600. For example, when the first device 600 is unlocked, the indicator may emit steady or blinking green light. As another example, when the first device 600 is locked, the indicator may emit steady or blinking red light.

The display component 614 may be configured to input or output signals, information, etc. In some embodiments, the display component 614 may include one or more display devices. Exemplary display devices may include a liquid crystal display (LCD), a light-emitting diode (LED)-based display, a flat panel display, a curved screen, a television device, a cathode ray tube (CRT), or the like, or a combination thereof. In some embodiments, the display component 614 may output signals, information, etc. For example, the display component 614 may output a status of an object in the confined space, advertising data, barcode information, an instruction (e.g., a text, an image, a video) received from the second device, or the like, or any combination thereof. In some embodiments, the display component 614 may be used to input signals, information, etc. For example, the display component 614 may include a touch screen with virtual keys. A user may input an instruction (e.g., an unlock password, an unlock request, etc.). In some embodiments, the display component 614 may be configured to facilitate an instant video communication between a user of the first device 600 and a user of the second device. For example, the display component 614 may display a real-time image of the user of the first device 600 and/or the user of the second device during the instant video communication.

The sensor assembly 620 may be configured to detect status information relating to at least one of the first device 600, the door, the confined space, or an object within or in the vicinity of the first device 600, the door, or the confined space, etc. In some embodiments, the sensor assembly 620 may include one or more sensors. Exemplary sensors may include a Hall sensor, a gyroscope, an accelerometer, a light sensor, a displacement sensor, a pressure sensor, a temperature sensor, a humidity sensor, a fingerprint sensor, an iris sensor, an image sensor (e.g., a camera), or the like, or any combination thereof. Exemplary status information may include the accessibility of the confined space, a status of an object in the confined space, ambient information around the confined space or around the first device, a movement within or of the confined space, or the like, or any combination thereof. The door (or a cover) of the confined space may be operable to control (allow or deny) the access to the confined space. For example, the confined space may be accessible when the first device 600 on the door is unlocked. The status of an object in the confined space may include whether the object is put in the confined space or taken out from the confined space, information (e.g., a shape, a size, a temperature, a humidity, etc.) relating to the object, or the like. The ambient information around the confined space or around the first device 600 may include information in the form of sound, images, etc., around the confined space or around the first device 600. A movement within or of the confined space may include a movement of a subject (e.g., a human being, an animal, an item (e.g., a package) in the confined space, etc.) within the confined space, a movement (e.g., a change of a location) of the confined space, or the like. In some embodiments, the status information may be detected by the sensor assembly 620 in real time or at intervals (e.g., a frame every 2 seconds, 5 seconds, 1 minute, etc.). In some embodiments, the status information may be detected by the sensor assembly 620 in response to an interaction (e.g., a pressing on a key, a voice instruction, etc.) is received from the user through the interaction assembly 610.

The communication port 630 may be configured to facilitate communication between the first device 600 and the second device (or a third device). In some embodiments, the communication port 630 may be connected to a network (e.g., the network 520) to facilitate data communications. The communication port 630 may establish connections between the first device 600, the second device, the third device, or any other component of the smart lock system 500. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, NFC, mobile network (e.g., 3G, 4G, 5G, etc.), or the like, or a combination thereof.

In some embodiments, the first device 600 may generate a reminder based on at least one of the status information or the interaction information. For example, in response to receiving an interaction from the user through the interaction assembly 610, the first device 600 may generate a reminder based on the interaction. As another example, the sensor assembly 620 may detect the status information (e.g., an image or a video around the confined space or around the first device 600), and generate a reminder based on the interaction and/or the status information. The reminder may be in one or more of a plurality of forms, such as a text, a voice, an image, a video, or the like, or any combination thereof.

In some embodiments, data may be transmitted from the first device 600 to an associated device. The associated device may include a second device (e.g., the second device 530), a third device (e.g., the third device 550), or the like. The data to be transmitted may relate to at least one of the interaction information or the status information. For example, the first device 600 may transmit the interaction information or the status information to the associated device directly. As another example, the first device 600 may generate a reminder based on at least one of the status information or the interaction information. Further, the first device 600 may transmit the reminder to the associated device. In some embodiments, the first device 600 may receive data from the associated device. For example, an instruction in response to the remainder may be input by a user of the second device. The first device 600 may receive the instruction from the second device.

In some embodiments, the data to be transmitted from or received by the first device 600 may be encrypted. For example, the reminder and/or the instruction may be encrypted using the encryption algorithm in a secure communication method according to some embodiments of the present disclosure. As another example, the reminder and/or the instruction may be encrypted using another encryption algorithm not described in the present disclosure.

Merely for illustration purposes, one or more portions of the first device 600 may be installed on the door or the confined space. For example, the interaction assembly 610 may be installed on the door as a part thereof. The interaction assembly 610 may be operably connected (or referred to as connected for brevity) to the first device 600. As another example, the sensor assembly 620 may be installed on the confined space as a component thereof. The sensor assembly 620 may be operably connected to the first device 600 and/or the interaction assembly 610.

It should be noted that the above description of the first device 600 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. For example, one or more other components (e.g., a storage assembly configured to store data and/or instructions that a computing device of the first device 600 may execute or use to perform exemplary methods described in the present disclosure) may be included in the first device 600. As another example, one or more other components or units of the sensor assembly 620 may be used in the interaction assembly 610. Merely by way of example, the fingerprint sensor, the iris sensor, or the image sensor may be used in the interaction assembly 610 as interaction devices. The user may interact with the first device 600 (e.g., performing an authentication to unlock the first device 600) through the sensors.

Figure 7:
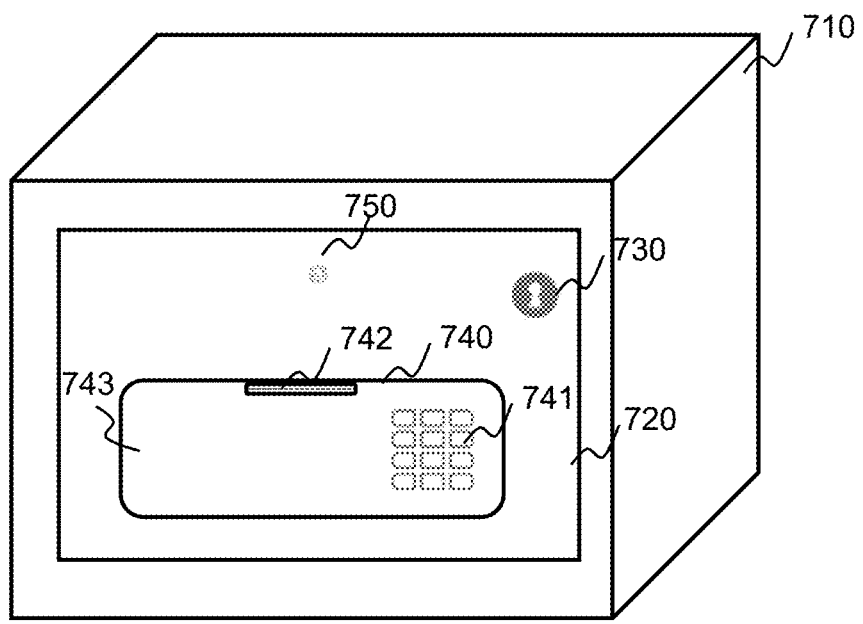
FIG. 7 is a schematic diagram illustrating an exemplary container according to some embodiments of the present disclosure.

FIG. 7 is a schematic diagram illustrating an exemplary container according to some embodiments of the present disclosure. As illustrated in FIG. 7, the container 700 may include a main body 710, a door 720, a smart lock 730, an interaction device 740, and a camera 750.

The main body 710 may provide a confined space to accommodate an item. In some embodiments, the container 700 or the main body 710 may have different configurations depending on actual needs. For example, the main body 710 may have different sizes for accommodating items of different sizes. As another example, the main body 710 may include a temperature control device that provides different temperatures to store items of different properties.

The door 720 may be operably connected (or referred to as connected for brevity) to the main body 710, for example, via a shaft mechanism. In some embodiments, the door 720 may be operable to control access to the container. For example, a user may open the door 720 to the confined space such that the confined space is accessible.

The smart lock 730 may be operably installed (or referred to as installed for brevity) on the door 720 to the main body 710. The smart lock 730 may be operable to control an accessibility of the container 700. For example, the smart lock 730 may be operated (e.g., by a user manually or by a device remotely) to lock the door 720 to the main body 710 such that the main body 710 of the container 700 is accessible. As another example, the smart lock 730 may be operated to unlock the door 720 such that the main body 710 of the container 700 is inaccessible. For brevity, an accessibility to the main body 710 of the container 700 may be referred to as an accessibility to the container 700.

The interaction device 740 may be configured to exchange interaction information relating to an interaction between a user and the smart lock 730, the door 720, or the container 700. As illustrated, the interaction device 740 may include a keypad 741, a voice interaction unit 742, and a display 743. The keypad 741 may include virtual keys disposed on a touch screen of the display 743. The user may input an instruction (e.g., an unlock password, a remote call instruction, an instruction for activating a configuration mode for generating and exchanging an encryption key, etc.) through the keypad 741 to control an operation of the container 700. The voice interaction unit 742 may facilitate a voice interaction between the user and the container 700. For example, the user may input an unlock instruction through a microphone of the voice interaction unit 742. As another example, the voice interaction unit 742 may facilitate an instant voice communication between the user of the container 700 and a remote user of a second device. The display 743 may be configured to input or output signals, information, etc. For example, the display 743 may output a status of an object in the container 700, advertising data, barcode information, an instruction (e.g., a text, an image, a video) received from a second device, or the like, or any combination thereof. In some embodiments, the display component 614 may be configured to facilitate an instant video communication between a user of the container 700 and a user of the second device.

The camera 750 may be configured to capture an image (or a video with or without concurrent audio) around the container 700 or around the smart lock 730. In some embodiments, the camera 750 may capture the image in real time or at intervals (e.g., a frame every 2 seconds, 5 seconds, 1 minute, etc.), or in response to detected information (e.g., a detected motion around the container 700 or around the smart lock 730, a detected operation of the smart lock 730). For instance, the camera 750 may capture the image in response to an interaction received from the user through the interaction unit 740.

In some embodiments, the container 700 may include a communication port configured to facilitate communication between the container 700 and an associated device. The associated device may include a second device (e.g., the second device 530), a third device (e.g., the third device 550), or the like. In some embodiments, the container 700 may include a computing device for processing data and/or information obtained from other components (e.g., the door 720, the smart lock 730, the interaction device 740, the camera 750, etc.) of the container 700, the associated device, or the like. For example, the computing device may generate a reminder based on at least one of the status information or the interaction information. Further, the computing device may transmit the reminder to the associated device through the communication port. Optionally or additionally, the reminder may be encrypted (e.g., using the encryption algorithm of the present disclosure) by the computing device before being transmitted. As another example, the computing device may receive an instruction from the associated device (e.g., the second device). Further, the computing device may control the container 700 (e.g., to unlock the smart lock 730, to play an alert, etc.) based on the instruction.

It should be noted that the above description of the container 700 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. For example, FIG. 7 illustrates only one container 700. However, there may be two or more containers 700. The two or more containers 700 may be operated independently (e.g., by two or more second devices) or controlled in a synchronized manner by one or more computing devices. As another example, the container 700 may include one or more additional components and/or one or more components of the container 700 described above may be omitted. As a further example, two or more components of the container 700 may be integrated into a single component. A component of the container 700 may be implemented on two or more sub-components.

In addition, a position, a shape, and/or a size of a component of the container 700 as shown in FIG. 7 are illustrative, and the component may be installed at any suitable position and/or have any suitable size and/or shape. For example, the smart lock 730, the interaction device 740, or the camera 750 may be installed on an outer wall of the main body 710.

Figure 8:
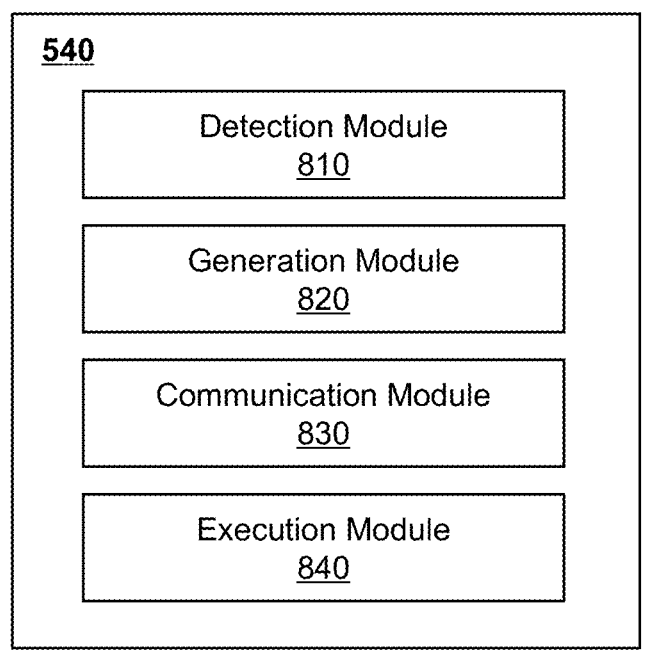
FIG. 8 is a block diagram illustrating an exemplary processing device according to some embodiments of the present disclosure.

FIG. 8 is a block diagram illustrating an exemplary processing device according to some embodiments of the present disclosure. In some embodiments, at least a portion of the processing device 540 may be implemented on a computing device of at least one of a first device, a door, or a confined space. As illustrated in FIG. 8, the processing device 540 may include a detection module 810, a generation module 820, a communication module 830, and an execution module 840. One or more of the modules of the processing device 540 may be interconnected. The connection(s) may be wireless or wired.

The detection module 810 may be configured to obtain status information relating to at least one of a first device, a door, or a confined space, or interaction information relating to an interaction between a user and at least one of the first device, the door, or the confined space. In some embodiments, at least one of the first device, the door, or the confined space may be equipped with an interaction assembly (e.g., the interaction assembly 610) and a sensor assembly (e.g., the sensor assembly 620). The detection module 810 may be configured to obtain the interaction information from the interaction assembly. The detection module 810 may be configured to obtain the status information from the sensor assembly. Exemplary status information may include the accessibility of the confined space, a status of an object in the confined space, ambient information around the confined space or around the first device, a movement within or of the confined space, or the like, or any combination thereof. In some embodiments, the status information and the interaction information may be independently obtained by the detection module 810, respectively. In some embodiments, the obtaining of the status information may depend on the obtaining of the interaction information.

The generation module 820 may be configured to generate a reminder based on at least one of the status information or the interaction information. In some embodiment, the generation module 820 may be configured to generate the reminder based on the interaction information. In some embodiment, the processing device 540 may be configured to generate the reminder based on the status information. In some embodiment, the generation module 820 may be configured to generate the reminder based on the status information and the interaction information. In some embodiment, the generation module 820 may be configured to encrypt the reminder, for example, using the encryption algorithm in a secure communication method according to some embodiments of the present disclosure, or using another encryption algorithm not described in the present disclosure.

The communication module 830 may be configured to transmit the reminder to a second device. In some embodiments, the communication module 830 may be configured to transmit the reminder to the second device through a communication port (e.g., the communication port 630). In some embodiments, the communication module 830 may be configured to receive an instruction from the second device.

The execution module 840 may be configured to unlock the first device based on the instruction. For example, the execution module 840 may be configured to decrypt the instruction using a decryption algorithm corresponding to the encryption algorithm. Further, the execution module 840 may be configured to unlock the first device based on the decrypted instruction.

It should be noted that the above descriptions of the processing device 540 are provided for the purposes of illustration, and not intended to limit the scope of the present disclosure. For persons having ordinary skills in the art, various modifications and changes in the forms and details of the application of the above method and system may occur without departing from the principles of the present disclosure. Merely by way of example, the processing device 540 may include one or more other modules. However, those variations and modifications also fall within the scope of the present disclosure. For example, the processing device 540 may include an encryption module and a decryption module. The encryption module may be configured to determine encrypted data corresponding to the reminder. The decryption module may be configured to decrypt encrypted data corresponding to the instruction if the instruction is encrypted by the second device. As another example, the instruction may also include data used for other purposes (e.g., an instruction used to lock the first device in response to status information that the first device is unlocked, an instruction used to notify an agency in response to a movement of the confined space, etc.). Correspondingly, the execution module 840 may be configured to perform other operations corresponding to the purposes.

Figure 9:
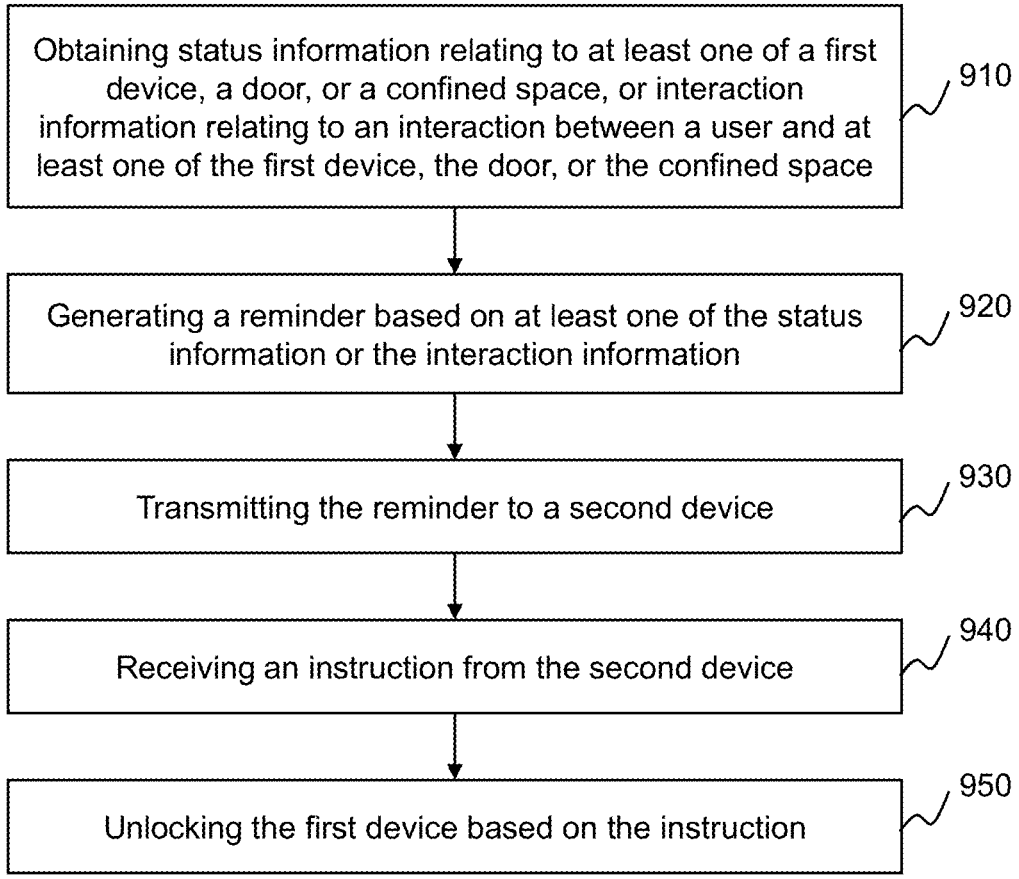
FIG. 9 is a flowchart illustrating an exemplary process for controlling an accessibility of a confined space according to some embodiments of the present disclosure.

FIG. 9 is a flowchart illustrating an exemplary process for controlling an accessibility of a confined space according to some embodiments of the present disclosure. In some embodiments, the process 900 may be implemented by a smart lock system (e.g., the smart lock system 500). In some embodiments, the smart lock system may be implemented by software and/or hardware. In some embodiments, at least part of process 900 may be performed by the processing device 540 (implemented in, for example, a computing device of the first device 510). For example, the process 900 may be stored in a storage device in the form of instructions (e.g., an application), and invoked and/or executed by the processing device 540. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the processing device 540 (e.g., the detection module 810) may obtain status information relating to at least one of a first device, a door, or a confined space, or interaction information relating to an interaction between a user and at least one of the first device, the door, or the confined space. In some embodiments, the first device may include a smart lock that is operably installed (or referred to as installed for brevity) on the door to the confined space so as to control an accessibility of the confined space. In some embodiments, at least one of the first device, the door, or the confined space may be equipped with an interaction assembly (e.g., the interaction assembly 610) and a sensor assembly (e.g., the sensor assembly 620). The processing device 540 may obtain the interaction information from the interaction assembly. The processing device 540 may obtain the status information from the sensor assembly. Exemplary status information may include the accessibility of the confined space, a status of an object in the confined space, ambient information around the confined space or around the first device, a movement within or of the confined space, or the like, or any combination thereof. In some embodiments, the status information and the interaction information may be independently obtained by the processing device 540, respectively. In some embodiments, the obtaining of the status information may depend on the obtaining of the interaction information. For example, processing device 540 may obtain the status information in response to receiving the interaction. As another example, the processing device 540 may obtain the status information in response to receiving an abnormal interaction (a wrong password, two or more quick clicks on keys (e.g., when the user is in danger), etc.).

In 920, the processing device 540 (e.g., the generation module 820) may generate a reminder based on at least one of the status information or the interaction information. In some embodiment, the processing device 540 may generate the reminder based on the interaction information. For example, in response to receiving an interaction between the user and at least one of the first device, the door, or the confined space, the processing device 540 may generate a reminder based on the interaction. In some embodiment, the processing device 540 may generate the reminder based on the status information. For example, the status information may include that an object is put in the confined space. The processing device 540 may generate a reminder for reminding the arrival of the object. In some embodiment, the processing device 540 may generate the reminder based on the status information and the interaction information. For example, the processing device 540 may generate a reminder including the interaction and a video of the user during the interaction. In some embodiment, the status information and/or the interaction information may be used directly as the reminder. In some embodiment, the reminder may be in one or more of a plurality of forms, such as a text, a voice, an image, a video, or the like, or any combination thereof.

In some embodiment, the processing device 540 may encrypt the reminder. For example, the processing device 540 may encrypt the reminder using the encryption algorithm in a secure communication method according to some embodiments of the present disclosure. As another example, the processing device 540 may encrypt the reminder using another encryption algorithm not described in the present disclosure.

In 930, the processing device 540 (e.g., the communication module 830) may transmit the reminder to a second device. In some embodiments, the processing device 540 may transmit the reminder to the second device through a communication port (e.g., the communication port 630). In some embodiments, the reminder may be displayed to a user of the second device. For example, the reminder may be displayed through messages, web tips, application pushes, or the like, or any combination thereof. In some embodiments, the first device installed on the door may be remotely operated through the second device (e.g., the second device 530).

In 940, the processing device 540 (e.g., the communication module 830) may receive an instruction from the second device. For example, the user of the second device may input an instruction for unlocking the first device. The instruction may be transmitted from the second device to the first device. In some embodiments, the instruction may be encrypted by the second device. For example, the second device may encrypt the instruction using the encryption algorithm in a secure communication method according to some embodiments of the present disclosure. As another example, the second device may encrypt the instruction using another encryption algorithm not described in the present disclosure.

In 950, the processing device 540 (e.g., the execution module 840) may unlock the first device based on the instruction. For example, the processing device 540 may decrypt the instruction using a decryption algorithm corresponding to the encryption algorithm. Further, the processing device 540 may unlock the first device based on the decrypted instruction.

It should be noted that the above description of the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, other instructions may also be transmitted from the second device. Merely by way of example, the instruction may be generated in response to status information that the first device is unlocked, which may be used to lock the first device to the confined space. As another example, the instruction may be generated in response to a movement of the confined space, which may be used to notify an agency (e.g., a police station, a security company, etc.) that provides relevant services, e.g., security services. As a further example, the process 900 may include an operation in which the first device may transmit a reminder (or an instruction) to a third device.

In the above embodiments of the present disclosure, the description of the various embodiments has a different emphasis, and the details are not described in detail in a certain embodiment, and the related description of other embodiments may be referred to.

In the several embodiments of the present disclosure, it should be understood that the disclosed technical contents may be implemented in other manners. The device embodiment described above is only schematic, for example, the division of the unit may be a logical function division, and may actually have another division manner when actually implemented. For example, a plurality of units or components may be combined or may be integrated into another system, or some features may be ignored or not executed. In addition, the mutual coupling or direct coupling or communication connection shown or discussed may be an indirect coupling or communication connection through some interface, unit or module, and maybe electrical or otherwise.

The units described as separate components may or may not be physically separate, and the components are shown as the unit may or may not be physical units, i.e., may be located in one place, or may be distributed to a plurality of units. Some or all of the units may be selected according to actual needs to achieve the purpose of the solution of the embodiment.

In addition, each functional unit in each embodiment of the present disclosure may be integrated into one processing unit, or maybe a physical unit of each unit alone, or two or more units may be integrated into one unit. The integrated unit may be implemented in the form of hardware or in the form of a software functional unit.

The above description is only preferred embodiments of the present disclosure, and it should be noted that those skilled in the art may make several improvements and modifications without departing from the principles of the present disclosure. These improvements and modifications should also be considered as protection of the present disclosure.

I claim:

1. A system comprising a first device and a second device, the first device being configured to:
   generate data to be transmitted;
   determine initial encrypted data by encrypting, based on a first encryption key stored in the first device, the data to be transmitted using an encryption algorithm;
   configure a preset key value for the initial encrypted data, wherein the preset key value includes at least one of a timestamp, a counter reading, or a random code;
   determine encrypted data by adding a verification signature to the initial encrypted data configured with the preset key value; and
   send the encrypted data to the second device.

2. The system of claim 1, wherein
   one of the first device and the second device is a smart lock, and
   the other of the first device and the second device is a control device.

3. The system of claim 2, where the encrypted data includes information configured to cause the smart lock to unlock or lock.

4. The system of claim 2, wherein the first device is the smart lock,
   the second device is the control device,
   the data to be transmitted includes at least one of an unlocking record, a historical record, a status of a sensor on a door, or the presence of anyone in a room.

5. The system of claim 1, wherein the encrypted data includes a unique identifier representing an identity of the first device, and the second device is configured to:
   receive the encrypted data with the identifier;
   determine that the encrypted data is sent from a paired first device by performing an identity authorization on the encrypted data with the identifier; and
   generate decrypted data by decrypting the encrypted data using a second encryption key stored in the second device according to a result of the identity authorization.

6. The system of claim 5, wherein the decrypting the encrypted data comprises:
   verifying integrity of the verification signature of the encrypted data;
   verifying that the preset key value is legal; and
   decrypting the initial encrypted data using the second encryption key.

7. The system of claim 6, wherein:
   the first encryption key and the second encryption key are determined by authenticating an initial encryption key by the first device and the second device.

8. The system of claim 7, wherein:
   the initial encryption key is automatically generated by the first device or the second device or manually inputted; and the initial encryption key is transmitted between the first device and the second device through a preset communication channel.

9. The system of claim 5, wherein the encryption algorithm is a symmetric encryption algorithm, the second encryption key is the same as the first encryption key, and the verification signature includes a hash value.

10. The system of claim 5, wherein the encryption algorithm is an asymmetric encryption algorithm, the first encryption key is a first public key stored in the first device, the verification signature is a first private key stored in the first device, the second device verifies integrity of the verification signature using a second public key stored in the second device, and the second encryption key is a second private key stored in the second device.

11. The system of claim 1, wherein the first device includes a smart lock that is operably installed on a door to a confined space so as to control an accessibility of the confined space.

12. The system of claim 11, wherein at least one of the first device, the door, or the confined space is equipped with:

an interaction assembly, configured to exchange interaction information relating to an interaction between a user and at least one of the first device, the door, or the confined space; and a sensor assembly, configured to detect status information relating to at least one of the first device, the door, or the confined space; and the data to be transmitted relates to at least one of the interaction information or the status information.

13. The system of claim 12, wherein the status information includes at least one of: the accessibility of the confined space, a status of an object in the confined space, ambient information around the confined space or around the first device, or a movement within or of the confined space.

14. The system of claim 12, wherein the data to be transmitted further includes a reminder based on at least one of the status information or the interaction information; and the controlling of the accessibility of the confined space includes:

transmitting the reminder to the second device;

receiving an instruction from the second device; and unlocking the first device based on the instruction.

15. The system of claim 11, wherein the confined space is a container or a room.

16. The system of claim 11, further including a third device, wherein the system is further configured to make a change to the third device when a change in the accessibility of the confined space occurs.

17. A first device operably connected to a second device, wherein the first device is configured to:

generate data to be transmitted;

determine initial encrypted data by encrypting, based on an encryption key stored in the first device, the data to be transmitted using an encryption algorithm;

configure a preset key value for the initial encrypted data, wherein the preset key value includes at least one of a timestamp, a counter reading, or a random code;

determine encrypted data by adding a verification signature to the initial encrypted data configured with the preset key value; and transmit the encrypted data to the second device.

18. A first device operably connected to a second device, wherein the first device is configured to:

receive encrypted data from the second device, the encrypted data including a verification signature and a preset key value, wherein the preset key value includes at least one of a timestamp, a counter reading, or a random code;

verify integrity of the verification signature of the encrypted data;

verify that the preset key value is legal; and generate decrypted data by decrypting, based on an encryption key stored in the first device, the encrypted data using a decryption algorithm.

19. The system of claim 1, wherein to send the encrypted data to the second device, the first device is further configured to:

configure a unique identifier for the encrypted data, the unique identifier representing an identity of the first device; and send the encrypted data with the unique identifier.

20. The system of claim 19, wherein the unique identifier includes a MAC address or an IP address of the first device.

* * * * *